(12) United States Patent
Winsness

(10) Patent No.: US 9,012,668 B2
(45) Date of Patent: Apr. 21, 2015

(54) METHOD AND SYSTEMS FOR ENHANCING OIL RECOVERY FROM ETHANOL PRODUCTION BYPRODUCTS

(75) Inventor: David J. Winsness, Alpharetta, GA (US)

(73) Assignee: GS Cleantech Corporation, New York, NY (US)

(*) Notice: Subject to any disclaimer, the term of this patent is extended or adjusted under 35 U.S.C. 154(b) by 811 days.

(21) Appl. No.: 13/185,841

(22) Filed: Jul. 19, 2011

(65) Prior Publication Data

US 2012/0009658 A1 Jan. 12, 2012

Related U.S. Application Data

(63) Continuation of application No. 11/856,150, filed on Sep. 17, 2007, now Pat. No. 8,168,037, and a continuation of application No. 11/908,891, filed as application No. PCT/US2006/009238 on Mar. 15, 2006.

(60) Provisional application No. 60/661,733, filed on Mar. 16, 2005.

(51) Int. Cl.
| | |
|---|---|
| *C11B 1/10* | (2006.01) |
| *C11B 3/00* | (2006.01) |
| *C12F 3/10* | (2006.01) |
| *B01D 3/00* | (2006.01) |
| *B01D 17/02* | (2006.01) |

(Continued)

(52) U.S. Cl.
CPC ... *C11B 3/00* (2013.01); *C12F 3/10* (2013.01); *B01D 3/002* (2013.01); *B01D 17/0208* (2013.01); *B01D 21/009* (2013.01); *Y02E 50/13* (2013.01); *B01D 21/262* (2013.01); *B01D 2221/06* (2013.01); *Y10S 159/08* (2013.01); *Y02E 50/17* (2013.01); *C10G 2300/1014* (2013.01); *B01D 1/26* (2013.01)

(58) Field of Classification Search
None
See application file for complete search history.

(56) References Cited

U.S. PATENT DOCUMENTS

| 313,665 A | 11/1884 | Greene |
| 365,120 A | 6/1887 | DeLaval |

(Continued)

FOREIGN PATENT DOCUMENTS

| DE | 19547866 C1 | 4/1997 |
| FR | 1568774 A | 10/1967 |

(Continued)

OTHER PUBLICATIONS

Records, A. et al., 4.5 Three phase separation, 2001, Decanter Centrifuge Handbook, 4 pages.*

(Continued)

*Primary Examiner* — Yate K Cutliff
(74) *Attorney, Agent, or Firm* — Cantor Colburn LLP

(57) ABSTRACT

Methods and related systems efficiently and effectively recover a significant amount of valuable, useable oil from byproducts formed during a dry milling process used for producing ethanol. The method may include forming a concentrate from the byproduct and recovering oil from the concentrate. The step of forming the concentrate may comprise evaporating the byproduct using a multi-stage evaporator, as well as recovering the oil before the final stage of the evaporator. Further, the step of recovering oil from the concentrate may comprise using a centrifuge and, in particular, a disk stack centrifuge. Other aspects include related methods and subsystems for recovering oil.

12 Claims, 11 Drawing Sheets

(51) Int. Cl.
  *B01D 21/00* (2006.01)
  *B01D 21/26* (2006.01)
  *B01D 1/26* (2006.01)

(56) References Cited

U.S. PATENT DOCUMENTS

| | | | |
|---|---|---|---|
| 445,066 | A | 1/1891 | DeLaval |
| 1,310,977 | A | 7/1919 | Barton |
| 1,366,339 | A | 1/1921 | Alexander |
| 2,206,024 | A | 8/1937 | Brown |
| 2,216,904 | A | 10/1940 | Brown |
| 2,216,905 | A | 10/1940 | Brown et al. |
| 2,263,608 | A | 11/1941 | Brown |
| 2,325,327 | A | 7/1943 | Lachle |
| 2,439,177 | A | 1/1946 | Manning |
| 2,446,913 | A | 8/1948 | Erlich |
| 2,615,029 | A | 2/1950 | Rosten |
| 2,524,718 | A | 10/1950 | Stark |
| 2,663,718 | A * | 12/1953 | Strezynski ............ 554/177 |
| 2,929,150 | A | 3/1960 | Johnston |
| 3,061,622 | A | 10/1962 | Fiala |
| 3,451,990 | A | 6/1969 | Sole, Jr. |
| 3,460,751 | A | 8/1969 | Hemfort, Sr. |
| 3,721,568 | A | 3/1973 | Wilson |
| 3,931,258 | A | 1/1976 | Lake |
| 3,950,230 | A | 4/1976 | Greenfield et al. |
| 4,061,568 | A | 12/1977 | Hall |
| 4,105,553 | A | 8/1978 | Oldham |
| 4,137,335 | A | 1/1979 | Holm et al. |
| 4,163,009 | A | 7/1979 | Filstrup |
| 4,216,239 | A | 8/1980 | Gloppestad |
| 4,270,974 | A | 6/1981 | Greenfield et al. |
| 4,341,713 | A | 7/1982 | Stolp et al. |
| 4,381,220 | A | 4/1983 | Standiford |
| 4,407,955 | A | 10/1983 | Muller et al. |
| 4,425,239 | A | 1/1984 | Jacocks et al. |
| 4,532,144 | A | 7/1985 | Vernet |
| 4,593,614 | A | 6/1986 | Berge et al. |
| 4,619,789 | A | 10/1986 | Strop et al. |
| 4,662,990 | A | 5/1987 | Bonanno |
| 4,812,225 | A | 3/1989 | Corti et al. |
| 4,944,954 | A | 7/1990 | Strop et al. |
| 4,952,504 | A | 8/1990 | Pavilon |
| 5,113,755 | A | 5/1992 | Anderson et al. |
| 5,250,182 | A | 10/1993 | Bento et al. |
| 5,256,251 | A | 10/1993 | Holcombe |
| 5,269,947 | A | 12/1993 | Baskis |
| 5,278,325 | A | 1/1994 | Strop et al. |
| 5,316,782 | A | 5/1994 | Zimlich, III |
| 5,439,701 | A | 8/1995 | Zimlich, III |
| 5,470,458 | A | 11/1995 | Ripley et al. |
| 5,662,810 | A | 9/1997 | Willgohs |
| 5,801,140 | A | 9/1998 | Langley et al. |
| 5,958,233 | A | 9/1999 | Willgohs |
| 5,980,754 | A | 11/1999 | Hopkins et al. |
| 5,998,641 | A | 12/1999 | Ganguli et al. |
| 6,106,673 | A | 8/2000 | Walker |
| 6,106,678 | A | 8/2000 | Shufflebotham et al. |
| 6,143,532 | A | 11/2000 | Wenzel et al. |
| 6,146,645 | A | 11/2000 | Deckers et al. |
| 6,214,236 | B1 | 4/2001 | Scalliet |
| 6,433,146 | B1 | 8/2002 | Cheryan |
| 6,726,941 | B2 | 4/2004 | Ethington, Jr. et al. |
| 6,761,914 | B2 | 7/2004 | Deckers et al. |
| 7,297,236 | B1 * | 11/2007 | Vander Griend ............ 202/153 |
| 7,431,952 | B2 | 10/2008 | Bijl et al. |
| 7,572,627 | B2 * | 8/2009 | Rieke et al. ............ 435/293.2 |
| 7,601,858 | B2 | 10/2009 | Cantrell et al. |
| 8,008,516 | B2 | 8/2011 | Cantrell et al. |
| 8,008,517 | B2 | 8/2011 | Cantrell et al. |
| 8,168,037 | B2 | 5/2012 | Winsness |
| 8,283,484 | B2 | 10/2012 | Cantrell et al. |
| 2003/0093832 | A1 | 5/2003 | Szarka et al. |
| 2003/0180415 | A1 | 9/2003 | Stiefel et al. |
| 2004/0081654 | A1 | 4/2004 | Schryvers et al. |
| 2004/0082044 | A1 | 4/2004 | Prevost et al. |
| 2004/0087808 | A1 * | 5/2004 | Prevost et al. ............ 554/9 |
| 2008/0190567 | A1 | 8/2008 | Winsness |
| 2010/0028484 | A1 | 2/2010 | Kriesler et al. |
| 2011/0282085 | A1 | 11/2011 | Cantrell et al. |
| 2012/0205324 | A1 | 8/2012 | Cantrell et al. |

FOREIGN PATENT DOCUMENTS

| | | |
|---|---|---|
| GB | 1070128 A | 5/1967 |
| GB | 1200672 A | 7/1970 |
| GB | 2007205 A | 8/1978 |
| JP | 54064683 A | 5/1979 |

OTHER PUBLICATIONS

Ace Ethanol LLC, "Ace Ethanol LLC, Amended Appendix B. Statement of Disputed Facts," filed in the United States District Court for the Southern District of Indiana Indianapolis Division, Case No. 1:10-ml-02181-LJM-DML, on Nov. 21 2012; 4 pages.

Ace Ethanol LLC, "Memorandum of Law in Support of Motion for Summary Judgment of Non-Infringement by Ace Ethanol, LLC, Al-Corn Clean Fuel, Blue Flint Ethanol, LLC, Bushmills Ethanol, Inc., Chippewa Valley Ethanol Company, LLLP, Heartland Corn Products, Lincolnway Energy, LLC, and United Wisconsin Grain Producers LLC," filed in the United States District Court for the Southern District of Indiana Indianapolis Division, Case No. 1:10-ml-02181-LJM-DML, on Jul. 3, 2012; 45 pages.

Adkins Energy LLC, "Adkins Combined Memorandum of Law Stating Adkins-Specific Arguments in Opposition to Cleantech's Motion for Summary Judgment of Infringement and in Support of Adkins's Motion for Summary Judgment on Unclean Hands," filed in the United States District Court for the Southern District of Indiana Indianapolis Division, Case No. 1:10-ml-02181-LJM-DML, on Sep. 24, 2013; 17 pages including certificate of service.

Adkins Energy LLC, "Adkins Memorandum of Law in Opposition to Cleantech's Motion for Summary Judgment," filed In the United States District Court for the Southern District of Indiana Indianapolis Division, Case No. 1:10-ml-02181-LJM-DML, on Mar. 26, 2013; 41 pages including certificate of service.

Adkins Energy LLC, "Adkins Energy LLC's Memorandum in Opposition to GS Cleantech's Motion for Summary Judgment of Infringement," filed in the United States District Court for the Southern District of Indiana Indianapolis Division, Case No. 1:10-ml-02181-LJM-DML, on Nov. 26, 2012; 11 pages including certificate of service.

Cardinal Ethanol LLC, "Separate Opposition Brief of Cardinal Ethanol, LLC to Plaintiff GS Cleantech's Motion for Summary Judgment of Infringement," filed in the United States District Court for the Southern District of Indiana Indianapolis Division, Case No. 1:10-ml-02181-LJM-DML, on Nov. 15, 2012; 8 pages.

"Defendant's (With the Exception of Adkins Energy) Joint Reply in Support of Their Respective Motions for Summary Judgment of Noninfringement," filed in the United States District Court for the Southern District of Indiana Indianapolis Division, Case No. 1:10-ml-02181-LJM-DML, on Sep. 7, 2012; 37 pages including certificate of service.

GEA Mechanical Equipment US, Inc., "GEA Mechanical Equipment US Inc.'s Notice Re Non-Joinder of Defendant Ace Ethanol, LLC's Motion for Summary Judgment of Non-Infringment" filed in the United States District Court for the Southern District of Indiana Indianapolis Division, Case No. 1:10-ml-02181-LJM-DML, on Oct. 12, 2012; 2 pages.

GEA Mechanical Equipment US, Inc., "GEA Mechanical Equipment US Inc.'s Brief in Support of its Motion for Summary Judgment on the Issue of Liability for Inducing or Contributing to Infringement," filed in the United States District Court for the Southern District of Indiana Indianapolis Division, Case No. 1:10-ml-02181-LJM-DML, on Sep. 23, 2013; 20 pages.

GEA Mechanical Equipment US, Inc., and Ace Ethanol, LLC, Corrected Memorandum of Law in Support of Defendants' Joint Motion for Summary Judgment of Invalidity and to Dismiss Plaintiff's Request for Provisional Remedies and Enhanced Damages for Will-

(56) References Cited

OTHER PUBLICATIONS ful Infringement, filed in the United States District Court for the Southern District of Indiana Indianapolis Division, Case No. 1:10-ml-02181-LJM-DML, on Oct. 4, 2013; 138 pages.
GEA Mechanical Equipment US, Inc., and Ace Ethanol, LLC, "Memorandum of Law in Support of Defendants' Joint Motion for Summary Judgment of Invalidity and to Dismiss Plaintiff's Request for Provisional Remedies and Enhanced Damages for Willful Infringement," filed in the United States District Court for the Southern District of Indiana Indianapolis Division, Case No. 1:10-ml-02181-LJM-DML, on Sep. 24, 2013, 139 pages.
GS Cleantech Corporation's, "GS Cleantech Corporation's Memorandum of Law in Opposition to Motions for Summary Judgment of Noninfringement by Ace Ethanol, LLC, Al-Corn Clean Fuel, Blue Flint Ethanol, LLC, Bushmills Ethanol, Inc., Chippewa Valley Ethanol Company, LLLP, Heartland Corn Products, Lincolnway Energy, LLC, and United Wisconsin Grain Producers LLC," filed in the United States District Court for the Southern District of Indiana Indianapolis Division, Case No. 1:10-ml-02181-LJM-DML, on Jul. 30, 2012; 49 pages including certificate of service.
GS Cleantech Corporation's, "GS Cleantech Corporation's Memorandum of Law in Opposition to Motions for Summary Judgment of Noninfringement by ICM, Inc., David Vander Griend, Cardinal Ethanol, LLC, Big River Resources West Burlington, LLC, Big River Resources Galva, LLC and Lincolnland Agri-Energy, LLC" filed in the United States District Court for the Southern District of Indiana Indianapolis Division, Case No. 1:10-ml-02181-LJM-DML, on Jul. 25, 2012; 40 pages.
GS Cleantech Corporation's, "GS Cleantech Corporation's Memorandum of Law in Opposition to Defendant Iroquois Bio-Energy, LLC's Motion for Summary Judgment of Non-Infringement," filed in the United States District Court for the Southern District of Indiana Indianapolis Division, Case No. 1:10-ml-02181-LJM-DML, on Jul. 25, 2012; 32 pages including certificate of service.
GS Cleantech Corporation's, "GS Cleantech Corporation's Motion to Strike Defendants ICM, Inc., David Vander Griend, Cardinal Ethanol, LLC, Big River Resources West Burlington, LLC, Big River Resources Galva, LLC, and Lincolnland Agri-Energy, LLC's Motion for Summary Judgment of Non-Infringement," filed in the United States District Court for the Southern District of Indiana Indianapolis Division, Case No. 1:10-ml-02181-LJM-DML, on Jun. 5, 2012; 3 pages.
GS Cleantech Corporation's, "GS Cleantech Corporation's Memorandum of Law in Support of Motion for Summary Judgment of Infringement by Adkins Energy, LLC," filed in the United States District Court for the Southern District of Indiana Indianapolis Division, Case No. 1:10-ml-02181-LJM-DML, on Sep. 14, 2012; 25 pages including certificate of service.
GS Cleantech Corporation's, "GS Cleantech Corporation's Memorandum of Law in Support of Motion for Summary Judgment of Infringement by Al-Corn Clean Fuel," filed in the United States District Court for the Southern District of Indiana Indianapolis Division, Case No. 1:10-ml-02181-LJM-DML, on Sep. 14, 2012; 28 pages including certificate of service.
GS Cleantech Corporation's, "GS Cleantech Corporation's Memorandum of Law in Support of Motion for Summary Judgment of Infringement by Big River Resources West Burlington, LLC," filed in the United States District Court for the Southern District of Indiana Indianapolis Division, Case No. 1:10-ml-02181-LJM-DML, on Sep. 14, 2012; 30 pages including certificate of service.
GS Cleantech Corporation's, "GS Cleantech Corporation's Memorandum of Law in Support of Motion for Summary Judgment of Infringement by Ace Ethanol, LLC," filed in the United States District Court for the Southern District of Indiana Indianapolis Division, Case No. 1:10-ml-02181-LJM-DML, on Sep. 14, 2012; 31 pages including certificate of service.
GS Cleantech Corporation's, "GS Cleantech Corporation's Memorandum of Law in Support of Motion for Summary Judgment of Infringement by Big River Resources Galva, LLC," filed in the United States District Court for the Southern District of Indiana Indianapolis Division, Case No. 1:10-ml-02181-LJM-DML, on Sep. 14, 2012; 25 pages including certificate of service.
GS Cleantech Corporation's, "GS Cleantech Corporation's Memorandum of Law in Support of Motion for Summary Judgment of Infringement by Lincolnland Agri-Energy, LLC," filed in the United States District Court for the Southern District of Indiana Indianapolis Division, Case No. 1:10-ml-02181-LJM-DML, on Sep. 14, 2012; 30 pages including certificate of service.
GS Cleantech Corporation's, "Plaintiff's Memorandum in Opposition to Defendants' Joint Motion for Summary Judgment of Invalidity and to Dismiss Plaintiffs' Request for Provisional Remedies and Enhances Damages for Willful Infringement," filed in the United States District Court for the Southern District of Indiana Indianapolis Division, Case No. 1:10-ml-02181-LJM-DML, on Nov. 22, 2013; 150 pages.
GS Cleantech Corporation's, "Memorandum of Law in Support of its Motions for Summary Judgment of Infringement by the '037 Plant Defendants," filed in the United States District Court for the Southern District of Indiana Indianapolis Division, Case No. 1:10-ml-02181-LJM-DML, on Oct. 23, 2013; 42 pages.
GS Cleantech Corporation's, "Memorandum of Law in Support of its Motion for Summary Judgment of Infringement by Plant Defendants," filed in the United States District Court for the Southern District of Indiana Indianapolis Division, Case No. 1:10-ml-02181-LJM-DML, on Jul. 23, 2013; 107 pages.
GS Cleantech Corporation's, Consolidated Reply memorandum in Support of its Motion for Summary Judgment of Infringement and Opposition to Individual Defendant's Motions for Summary Judgment, filed in the United States District Court for the Southern District of Indiana Indianapolis Division, Case No. 1:10-ml-02181-LJM-DML, on Nov. 25, 2013; 77 pages.
GS Cleantech Corporation's, "GS Cleantech Corporation's Memorandum of Law in Support of Motion for Summary Judgment on Count 1 of Adkins Energy LLC's Counterclaims for Breach of Contract (and Related Affirmative Defenses)," filed in the United States District Court for the Southern District of Indiana Indianapolis Division, Case No. 1:10-ml-02181-LJM-DML, on Feb. 19, 2013; 41 pages.
GS Cleantech Corporation's, "GS Cleantech Corporation's Surreply in Response to Defendants' (With the Exceptionof Adkins Energy) Joint Reply in Support of their Respective Motions for Summary Judgment of Noninfringement," filed in the United States District Court for the Southern District of Indiana Indianapolis Division, Case No. 1:10-ml-02181-LJM-DML, on Sep. 28, 2012; 26 pages.
GS Cleantech Corporation's, "GS Cleantech Corporation's Reply in Support of its Motion for Summary Judgment on Count 1 of Adkins Enerfy LLC's Counterclaims for Breach of Contract, (and Related Affirmative Defenses)," filed in the United States District Court for the Southern District of Indiana Indianapolis Division, Case No. 1:10-ml-02181-LJM-DML, on Apr. 8, 2013; 19 pages.
GS Cleantech Corporation's, "GS Cleantech Corporation's Memorandum of Law in Support of Motion for Summary Judgment of Infringement by Lincolnway Energy, LLC," filed in the United States District Court for the Southern District of Indiana Indianapolis Division, Case No. 1:10-ml-02181-LJM-DML, on Sep. 14, 2012; 26 pages including certificate of service.
GS Cleantech Corporation's, "GS Cleantech Corporation's Memorandum of Law in Support of Motion for Summary Judgment of Infringement by Blue Flint Ethanol, LLC," filed in the United States District Court for the Southern District of Indiana Indianapolis Division, Case No. 1:10-ml-02181-LJM-DML, on Sep. 14, 2012; 34 pages including certificate of service.
GS Cleantech Corporation's, "GS Cleantech Corporation's Memorandum of Law in Support of Motion for Summary Judgment of Infringement by Bushmills Ethanol, Inc.," filed in the United States District Court for the Southern District of Indiana Indianapolis Division, Case No. 1:10-ml-02181-LJM-DML, on Sep. 14, 2012; 27 pages including certificate of service.
GS Cleantech Corporation's, "GS Cleantech Corporation's Memorandum of Law in Support of Motion for Summary Judgment of Infringement by Cardinal Ethanol, LLC," filed in the United States District Court for the Southern District of Indiana Indianapolis Divi-

(56) References Cited

OTHER PUBLICATIONS sion, Case No. 1:10-ml-02181-LJM-DML, on Sep. 14, 2012; 29 pages including certificate of service.
GS Cleantech Corporation's, "GS Cleantech Corporation's Memorandum of Law in Support of Motion for Summary Judgment of Infringement by Chippewa Valley EthanoL Company, LLLP," filed in the United States District Court for the Southern District of Indiana Indianapolis Division, Case No. 1:10-ml-02181-LJM-DML, on Sep. 14, 2012; 32 pages including certificate of service.
GS Cleantech Corporation's, "Defendants' (With the Exception of Adkins Energy, LLC) Joint Memorandum of Law in Opposition to Plaintiff's Motions for Summary Judgement of Infringement," filed in the United States District Court for the Southern District of Indiana Indianapolis Division, Case No. 1:10-ml-02181-LJM-DML, on Nov. 19, 2012; 72 pages.
GS Cleantech Corporation's, "GS Cleantech Corporation's Memorandum of Law in Support of Motion for Summary Judgment of Infringement by Heartland Corn Products," filed in the United States District Court for the Southern District of Indiana Indianapolis Division, Case No. 1:10-ml-02181-LJM-DML, on Sep. 14, 2012; 40 pages including certificate of service.
GS Cleantech Corporation's, "GS Cleantech Corporation's Memorandum of Law in Support of Motion for Summary Judgment of Infringement by United Winsconsion Grain Producers, LLC," filed in the United States District Court for the Southern District of Indiana Indianapolis Division, Case No. 1:10-ml-02181-LJM-DML, on Sep. 14, 2012; 31 pages including certificate of service.
GS Cleantech Corporation's, "GS Cleantech Corporation's Memorandum of Law in Support of Motion for Summary Judgment of Infringement by Iroquois Bio-Energy Company, LLC," filed in the United States District Court for the Southern District of Indiana Indianapolis Division, Case No. 1:10-ml-02181-LJM-DML, on Sep. 14, 2012; 27 pages including certificate of service.
ICM, Inc., "Defendants ICM, Inc., David Vander Griend, Cardinal Ethanol, LLC, Big River Resources West Burlington, LLC, Big River Resources Galva, LLC, Lincolnland Agri-Energy, LLC Memorandum in Support of Motion for Their Motion for Summary Judgment of Non-Infringement," filed in the United States District Court for the Southern District of Indiana Indianapolis Division, Case No. 1:10-ml-02181-LJM-DML, on May 23, 2012; 26 pages including certificate of service.
Iroquois Bio-Energy Company, LLC, "Iroquois Bio-Energy Company, LLC's Supplemental memorandum in Opposition to Plaintiff's Motion for Summary Judgment of Infringement," filed in the United States District Court for the Southern District of Indiana Indianapolis Division, Case No. 1:10-ml-02181-LJM-DML, on Nov. 15, 2012; 6 pages including certificate of service.
GS Cleantech Corporation's, "Defendant Iroquois Bio-Energy Company, LLC's Memorandum in Support of Motion for Summary Judgment of Non-Infringement," filed in the United States District Court for the Southern District of Indiana Indianapolis Division, Case No. 1:10-ml-02181-LJM-DML, on Jun. 4, 2012; 28 pages including certificate of service.
"Memoradum in Opposition to Adkins Energy LLC's Motion for Judgment on the Pleadings or in the Alternative for Partial Summary Judgment on the Issue of Liability for Breach of Contract, and for Partial Summary Judgment on One Part of Adkins' Damages," filed in the United States District Court for the Southern District of Indiana Indianapolis Division, Case No. 1:10-ml-02181-LJM-DML, on Mar. 24, 2011; 10 pages including certificate of service.
"Reply Memorandum in Support of Adkins Energy LLC's Motion for Judgment on the Pleadings or in the Alternative for Partial Summary Judgment on the Issue of Liability for Breach of Contract, and for Partial Summary Judgment on One Part of Adkin's Damages" filed in the United States District Court for the Southern District of Indiana Indianapolis Division, Case No. 1:10-ml-02181-LJM-DML, on Apr. 7, 2011; 12 pages.
"Memorandum in Support of Adkins Energy LLC's Motion for Judgment on the Pleadings or in the Alternative for Partial Summary Judgment on the Issue of Liability for Breach of Contract, and for Partial Summary Judgment on One Part of Adkins' Damages," filed in the United States District Court for the Southern District of Indiana Indianapolis Division, Case No. 1:10-ml-02181-LJM-DML, on Feb. 24, 2011; 12 pages including certificate of service.
Office Action—Non-Final for U.S. Appl. No. 13/107,197, filed May 13, 2011; First Named Inventor: David Fred Cantrell; Mailing Date: Dec. 13, 2011; 28 pgs.
Office Action—Restriction/Election for U.S. Appl. No. 11/122,859, filed May 5, 2005; First Named Inventor: David Fred Cantrell; Mail Date: Jun. 13, 2008; 7 pgs.
International Preliminary Report on Patentability for Search Report for PCT/US2005/028937 dated Feb. 20, 2007.
Abstract of JP54064683A; published May 24, 1979, 1 page.
Author Unknown, "Disc Stack Centrifuge" Alfa Laval website, www.alfalaval.com Aug. 3, 2004.
Alfa Laval, "NS 934 DD Decanter", PFT00017EN 0207, PFT00018EN 0207, PFT0007EN 0207, 6 pgs., dated prior to Sep. 17, 2007.
Bizimana, V., et al. "Avocado Oil Extraction with Appropriate Technology for Developing Countries" (JAOCS, vol. 70, No. 8 (Aug. 1993); pp. 821-822.
Castellanos, et al. Abstract of "Extraction of Oil from Fresh Coconut"; Oleagineux 24 (7): 419-21-24 (8/9) 505-09, 1969; 1 page.
Committee on Animal Nutrition, Board on Agriculture and Renewable Resources; Commission on Natural Resources; National Research Counsel "Feeding Value of Ethanol Production By-products"; National Academy Press, Washington, D.C. 1981; 80 pages.
Davis, Kelly S., "Corn Milling, Processing and Generation of Co-Products", Nutrition Conference—Minnesota Corn Growers Association, Technical Symposium, Sep. 11, 2001; 7 pgs.
Dominguez, H., et al. "Enzymatic pretreatment to enhance oil extraction from fruits and oilseeds: a review", Food Chemistry 49 (1994), pp. 271-286.
Food and Agriculture Organization of the United Nations / FAO, Fishery Industries Division, "The Production of Fish Meal and Oil"; FAO Fish. Tech. Pap (142) Rev. 1; (1986); 80 pgs.
Gupta, R., et al., "A Novel Approach to Process Crude Oil Membrane Concentrate Using a Centrifuge", Journal of the American Oil Chemists' Society, vol. 79, No. 5, (2002); pp. 419-423.
Hagenmeier et al. "Aqueous Processing of Fresh Coconuts for Recovery of Oil and Cocnut Skim Milk" Journal of Food Science, vol. 38, 1973, pp. 516-518.
S.S. Koseoglu et al., "Aqueous, Membrane and Adsorptive Separations of Vegetable Proteins", Good Protein Research and Development Center, Texas Engineering Experiment Station, Texas A&M University System, 1989, pp. 528-547.
Lehmann, Hanno-R., et al. "Whey Processing Lines" Westfalia Separator AG, Technical Scientific Documentation No. 6, 3rd Rev. Ed., 1988, 6 pgs.
McAloon et al., "Determining the Cost of Producing Ethanol from Corn Starch and Lignocellulosic Feedstocks", Ntional Renewable Energy Laboratory, NL/TP-580-28893, Oct. 2000; 43 pgs.
McIntyre, Craig., "Measurement solutions for Ethanol Producers", A white paper by Endress+Hauser, Inc., Copyright 2003, pp. 1-10.
PRX The ProExporter Network "PRX Digest Grain Database", constantly updated, 2010 summary 43 pages.
Puertollano, et al., "Separation of the Oil and Protein Fractions in Coconut", J. Agr. Food Chem., vol. 18, No. 4, 1970, pp. 579-685.
Rosenthal et al., "Aqueous and enzymatic processes for edible oil extraction", Enzyme Microb. Technol., vol. 19, Nov. 1, 1996, pp. 402-420.
Chicago Board of Trade, "Chicago Board of Trade (CBOT) SoyBean Oil Prices" graph, constantly updated, 1 pg., 2000-2009.
Stanton, W.R., "Fermentation Assisted Byproduct Recovery in the Palm Oil Industry", Agricultural Wastes 6, (1983), pp. 31-63.
Sweeten et al., "Removal and Utilization of Ethanol Stillage Constituents" Energy in Agriculture, 1 (1981-1983), Elsevier Science Publishers B.V.; pp. 331-345.
Tjardes, Kent et al., "Feeding Corn Distiller's Co-Products to Beef Cattle", Cooperative Extension Services, Extension Extra, ExEx 2036, Animal & Range Sciences, College of Agriculture & Biological Sciences / South Dakota State University / USDA, Aug. 2002, 5 pgs.

(56) References Cited

OTHER PUBLICATIONS

Westfalia Separator Industry "Decanters and Separators for Industrial Fish Processing", 1999, 36 pages.
Westfalia Separator AG / Communication Westfalia Magazine, Edition No. 3, International, "The Latest on Industrial Fish Processing" 1979, 103 pgs.
Digital Book provided by Google—Thesis of Winfield, Harriet The oil of maize (*Zea mays*); Library of the University of Wisconsin, New York, 1899; pp. 1-61.
Declaration of David F. Cantrell for U.S. Appl. No. 11/241,231, with Exhibits A and B, dated Nov. 8, 2010.
Declaration of David F. Cantrell for U.S. Appl. No. 12/559,136 with Exhibits A and B, dated Nov. 8, 2010.
Dote, Y., et al. "Liquefaction of Stillage from Ethanolic Fermentation and Upgrading of Liquefied Oil" Trans. Mat. Res. Soc. Jpn, vol. 18A, 1994, pp. 285-288.
*GEA Westfalia Separator, Inc.* v *Greenshift Corporation*, Complaint, Case No. 1:09-cv-07686-LMM; filed Sep. 3, 2009, pp. 1-28, stamped by Judge McKenna.
*GEA Westfalia Separator, Inc. and Ace Ethanol, LLC* v. *Greenshift Corporation*, Case No. 09 Civ. 7686 (LMM) ECF Case, First Amended Complaint, received in U.S. District Court S.D.N.Y, Oct. 13, 2009, pp. 1-36.
*GS Cleantech Corporation* v. *GEA Westfalia Separator, Inc.; Ace Ethanol, LLC; ICM, Inc.; Lifeline Foods LLC*; and Does 1-30, Inclusive, First Amended Complaint for Patent Infringement; Civil Action No. 09-cv-08642-SAS, filed Oct. 23, 2009, pp. 1-11.
*GS Cleantech Corporation* v. *GEA Westfalia Separator, Inc.*; and Does 1-20, Inclusive; Complaint, Case No. 1:09-cv-08642-LMM; filed Oct. 13, 2009, pp. 1-8.
*GS Cleantech Corporation*, Plaintiff v. *Big River Resources Galva, LLC and Big River Resources West Burlington, LLC*, Defendants; "Complaint"; filed in the United States District Court for the Northern District of Illinois, Eastern Division, on Feb. 12, 2010, Document 1; Case 1:10-cv-0090; 9 pgs.
*GS Cleantech Corporation*, Plaintiff, v. *Big River Resources Galva, LLC and Big River Resources West Burlington, LLC*, Defendants; "Motion for Preliminary Injunction"; filed in the United States District Court for the Northern District of Illinois, Eastern Division, Case No. 10-990, on Feb. 15, 2010, Document 6; Case 1:10-cv-0090, 2 pgs.
*GS Cleantech Corporation*, Plaintiff, v. *Big River Resources Galva, LLC and Big River Resources West Burlington, LLC*, Defendants, "Plaintiff's Memorandum of Law in Support of Its Motion for Preliminary Injunction" (with Exhibits 8, 8-1 through 8-8 inclusive), filed in the United States District Court for the Northern District of Illinois Easter Division, Case No. 10-990, on Feb. 15, 2010, Document 7, Case 1:10-cv-0090, 401 pgs.
*GS Cleantech Corporation*, Plaintiff, v. *Cardinal Ethanol, LLC*, Defendant, "Complaint for Patent Infringement", filed in United State District Court for the Southern District of Indianapolis Division, Civil Action No. 1:10-cv-0180LJM-DML; on Feb. 10, 2010; Document 1; Case No. 1:10-cv-00180-LJM-DML, 9 pgs.
*GS Cleantech Corporation*, Plaintiff, v. *Cardinal Ethanol, LLC*, Defendant, "Motion for Preliminary Injunction"; filed in United State District Court for the Southern District of Indiana, Indianapolis Division, Civil Action No. 1:10-cv-0180-LJM-DML, on Feb. 10, 2010, Document 7, Case No. 1:10-cv-00180-LJM-DML, 2 pgs.
*GS Cleantech Corporation*, Plaintiff, v. *Cardinal Ethanol, LLC*, Defendant; "Plaintiffs Reply Brief in Support of Its Motion for Preliminary Injunction" (with Exhibits 32 and 32-1); filed in United States District Court for the Southern District of Indiana, Indianapolis Division, Civil Action No. 1:10-cv-0180-LJM-DML, on Apr. 5, 2010; Document 31, Case 1:10-cv-0180-LJM-DML, 25 pgs.
*GS Cleantech Corporation*, Plaintiff v. *Cardinal Ethanol, LLC*, Defendant; "Plaintiffs Memorandum of Law in Support of its Motion for Preliminary Injunction" (with Exhibits 9-1 through 9-15 inclusive), filed in United States District Court Southern District of Indiana, Indianapolis Division, Civil Action No. 1:10-cv-0180-LJM-DML, on Feb. 11, 2010, Document 9, Case No. 1:10-cv-00180-LJM-DML, 456 pgs.
*GS Cleantech Corporation*, Plaintiff, v. *Cardinal Ethanol, LLC*, Defendant, "Defendant's Memorandum of Law in Opposition to Plaintiff's Motion for Preliminary Injunction" (with Exhibits 26-1 through 26-24 inclusive), Civil Action No. 1:10-cv-0180 LJM-DML; filed in United States District Court Southern District of Indiana Indianapolis Division, on Mar. 24, 2010, Document 26, Case 1:10-cv-00180-LJM-DML, 306 pgs.
*GS Cleantech Corporation*, Plaintiff, v. *GEA Westfalia Separator, Inc.; Ace Ethanol, LLC; ICM, Inc.; Lifeline Foods LLC*; and Does 1-30, Inclusive, Defendants, "Ace Ethanol, LLC's Answer to Plaintiff's First Amended Complaint for Patent Infringement", filed in United States District Court for the Southern District of New York, Civil Action No. 09-cv-08642-LMM; on Nov. 18, 2009, Document 19, Case 1:09-cv-08642-LMM, 9 pgs.
*GS Cleantech Corporation*, Plaintiff v. *GEA Westfalia Separator, Inc.; Ace Ethanol, LLC; ICM, Inc.; Lifeline Foods LLC*; and Does 1-30, Inclusive, Defendant; "First Amended Complaint for Patent Infringement"; filed United States District Court for the Southern District of New York, Civil Action No. 09-cv-08642-SAS, on Oct. 15, 2009, Document 3-2; Case 1:09-cv-08642-LMM, 11 pgs.
*GS Cleantech Corporation*, Plaintiff, v. *GEA Westfalia Separator, Inc.; Ace Ethanol, LLC; ICM, Inc.; Lifeline Foods LLC*; and Does 1-30, Inclusive, Defendants; "GEA Westfalia Separator, Inc.'s Answer to Plaintiff's First Amended Complaint for Patent Infringement" filed in United States District Court for the Southern District of New York; Civil Action No. 09-cv-08642-LMM, filed on Nov. 18, 2009, Document 21; Case 1:09-cv-08642-LMM, 9 pgs.
*ICM, Inc.* v. *GS Cleantech Corporation Greenshift Corporation*, Complaint for Declaratory Judgement, Civil Action No. 09-1315-WEB-KMH, filed Oct. 13, 2009, pp. 1-6.
*ICM, Inc., KMH*, Plaintiff v. *GS Cleantech Corporation—Greenshift Corporation*, Defendant; "First Amended Complaint for Declaratory Judgment"; filed in United States District Court, District of Kansas, Civil Action No. 09-1315-WEB-, on Oct. 14, 2009, Document 4; Case 6:09-cv-01315-WEB-KMH; 6 pgs.
Jacques et al. "The Alcohol Textbook" 3rd Edition, published 1999, Part 1 of 4 Parts, 53 pgs.
Jacques, et al., "The Alcohol Textbook", 3rd Edition, published 1999, Part 2 of 4 Parts, 50 pgs.
Jacques, et al., "The Alcohol Textbook", 3rd Edition, published 1999, Part 3 of 4 Parts, 50 pgs.
Jacques, et al., "The Alcohol Textbook", 3rd Edition, published 1999, Part 4 of 4 Parts, 42 pgs.
Minowa, T., et al. "Oil Production from Buckwheat Stillage by Thermochemical Liquefaction)" National Inst. for Resources and Environment Ibaraki (Japan), STN, Abstract, NTIS database, 1999.
No Author Available, "Thermochemical Liquefaction" Wisconsin Biorefining Development Initiative, www.wisbiorefine.org. pp. 1-4, dated sometime in 2004 as evidenced by copyright date; Energy Center of Wisconsin.
Notice of Allowance—Supplemental; U.S. Appl. No. 11/688,425, filed Mar. 20, 2007; First Named Inventor: David J. Winsness; Mail Date: Apr. 21, 2009.
Notice of Allowance; U.S. Appl. No. 11/241,231, filed Sep. 30, 2005; First Named Inventor: David Fred Cantrell; Mail Date: Aug. 11, 2010.
Notice of Allowance; U.S. Appl. No. 11/241,231, filed Sep. 30, 2005; First Named Inventor: David Fred Cantrell; Mail Date Feb. 17, 2010.
Notice of Allowance; U.S. Appl. No. 11/688,425, filed Mar. 20, 2007; First Named Inventor: David J. Winsness; Mail Date: Mar. 5, 2009.
Notice of Allowance; U.S. Appl. No. 11/122,859, filed May 5, 2005; First Named Inventor: David Fred Cantrell; Mail Date: Apr. 8, 2009.
Notice of Allowance; U.S. Appl. No. 11/688,425, filed Mar. 20, 2007; First Named Inventor: David J. Winsness; Mail Date: Aug. 10, 2009.
Notice of Allowance; U.S. Appl. No. 11/122,859, filed May 5, 2005; First Named Inventor: David Fred Cantrell; Mail Date: Aug. 25, 2009.
Office Action—Final for U.S. Appl. No. 11/856,150, filed Sep. 17, 2007; First Named Inventor: David J. Winsness; Mail Date: Feb. 25, 2011.

(56) References Cited

OTHER PUBLICATIONS

Office Action—Final; U.S. Appl. No. 11/856,150, filed Sep. 17, 2007; First Named Inventor: David J. Winsness; Mail Date: Feb. 22, 2010.
Office Action—Final, U.S. Appl. No. 11/122,859, filed May 5, 2005; First Named Inventor: David Fred Cantrell; Mail Date: Dec. 22, 2008.
Office Action—Final for U.S. Appl. No. 11/908,891, filed Sep. 17, 2007; First Named Inventor: David J. Winsness; Mailing Date: Dec. 22, 2010.
Office Action—Final; U.S. Appl. No. 11/241,231, filed Sep. 30, 2005; Inventor David Fred Cantrell; Mail Date: Dec. 26, 2008.
Office Action—Non-Final; U.S. Appl. No. 11/241,231, filed Sep. 30, 2005; First Named Inventor: David Fred Cantrell; Mail Date: Jan. 4, 2010.
Office Action—Non-Final; U.S. Appl. No. 11/908,891, filed Sep. 17, 2007; First Named Inventor: David J. Winsness; Mail Date: Jan. 21, 2010.
Office Action—Non-Final; U.S. Appl. No. 11/122,859, filed May 5, 2005; First Named Inventor: David Fred Cantrell; Mail Date: Jun. 13, 2008.
Office Action—Non-Final; U.S. Appl. No. 11/241,231, filed Sep. 30, 2005; Inventor David Fred Cantrell; Mail Date: Jun. 17, 2008.
Office Action—Non-Final for U.S. Appl. No. 11/908,891, filed Sep. 17, 2007; First Named Inventor: David J. Winsness; Mail Date: Jul. 13, 2010.
Office Action—Non-Final; U.S. Appl. No. 11/688,425, filed Mar. 20, 2007; First Named Inventor: David J. Winsness; Mail Date: Aug. 1, 2008.
Office Action—Non-Final; U.S. Appl. No. 11/241,231, filed Sep. 30, 2005; Inventor David Fred Cantrell; Mail Date: Aug. 20, 2009.
Office Action—Non-Final; U.S. Appl. No. 11/856,150, filed Sep. 17, 2007, Inventor David J. Winsness, Mail Date: Aug. 28, 2009.
Office Action—Non-Final; U.S. Appl. No. 11/688,425, filed Mar. 20, 2007; First Named Inventor: David J. Winsness; Mail Date: Oct. 31, 2007.
Office Action—Non-Final for U.S. Appl. No. 12/559,136, filed Sep. 14, 2009; First Named Inventor: David Fred Cantrell; Mail Date: Jul. 6, 2010.
Office Action—Non-Final for U.S. Appl. No. 11/856,150, filed Sep. 17, 2007; First Named Inventor: David J. Winsness; Mail Date: Aug. 13, 2010.
Defendants', Bushmills Ethanol, Inc., Chippewa Valley Ethanol Company, LLLP, Heartland Corn Products and United Wisconsin Grain Producers LLC, Preliminary Invalidity Contentions; filed in the United States District Court; Southern District of Indiana; Indianapolis Division; In Re: Method of Processing Ethanol Byproducts and Related Subsystems (858) Patent Litigation; Master Case No. 1:10-ml-02181-LJM-DML: dated Jan. 24, 2011; 23 pages.
Flottweg Separation Technology, Inc.'s Preliminary Invalidity Contentions; In Re: Method of Processing Ethanol Byproducts and Related Subsystems ('858') Patent Litigation; Master Case No. 1:10-MLO-02181-LJM-DML; Associated Case No. 1:10-cv-8010-LJM-DML; dated Jan. 24, 2011; 12 pages.
Preliminary Invalidity Contentions of Defendants ICM, Inc., Cardinal Ethanol, LLC, Big River Resoruces Galva, LLC, Big River Resources West Burlington, LLC and Lincolnland Agri-Energy, LLC; filed in the United States District Court; Southern District of Indiana; Indianapolis Division; In Re: Method for Processing Ethanol Byproducts and Related Subsystems ('858) Patent Litigation; 1:10-ml-02181-LJM-DML; dated Jan. 24, 2011, 9 pages.
Blue Flint Ethanol, LLC's Preliminary Invalidity Contentions; filed in the United States District Court; Southern District of Indiana; Indianapolis Division; In Re: Method or Processing Ethanol Byproducts and Related Subsystems ('858') Patent Litigation; Case No. 1:10-ml-02181-LJM-DML; Exhibits A-F included, dated Jan. 24, 2011; 77 pages.
Adkins Energy LLC's Preliminary Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 1:10-cv-08004-LJM-DML; dated Jan. 24, 2011, 19 pages; Exhibit A, pp. 1-14 and Exhibit B, pp. 1-146.
Al-Corn Clean Fuels' Preliminary Invalidity Contentions; filed in the United States District Court; Southern District of Indiana; Indianapolis Division; In Re: Method of Processing Ethanol Byproducts and Related Subsystems ('858) Patent Litigation; Master Case No. 1:10-ml-02181-LJM-DML; Associated Case No. 1:10-cv-08004-LJM-DML, dated Jan. 24, 2011; pp. 1-16.
GEA Westfalia Separator, Inc. and Ace Ethanol LLC.'s Preliminary Invalidity Contentions, filed in the United States District Court for the Southern District of Indiana; Indianapolis Division; In Re: Method of Processing Ethanol Byproducts and Related Subsystems ('858) Patent Litigation; 1:10-ml-02181-LJM-DML; filed Jan. 24, 2011: 28 pages.
Preliminary Invalidity Contentions by Lincolnway Energy, LLC; filed in the United States District Court, Southern District of Indiana; Indianapolis Division; In re: Method for Processing Ethanol Byproducts and Related Subsystems ('858) Patent Litigation; Master Docket: 1:10-ml-02181-LJM-DML; dated Jan. 24, 2011; 18 pages.
Amaizing Energy Preliminary Invalidity Contention; filed in the United States District Court for the Southern District of Indiana; Indianapolis Division; In Re: Method of Processing Ethanol Byproducts and Related Subsystems ('858) Patent Litigation; Master Case. No. 1:10-ml-02181-LJM-DML; Associated Case No. 1:10-CV-08001-LJM-DML; dated Jan. 24, 2011; 16 pages.
Iroquois Bio-Energy Company, LLC's Preliminary Invalidity Contentions; filed in the United States District Court for the Southern District of Indiana; Indianapolis Division; In Re: Method for Processing Ethanol Byproducts and Related Subsystems ('858) Patent Litigation; MDL Master Case No. 1:10-ml-02181-LJM-DML; dated Jan. 24, 2011; 25 pages.
Office Action—Election/Restriction; U.S. Appl. No. 11/241,231, filed Sep. 30, 2005; First Named Inventor: David Fred Cantrell; Mail Date: May 6, 2008.
Office Action—Restriction/Election; U.S. Appl. No. 11/908,891, filed Sep. 17, 2007; First Named Inventor: David J. Winsness; Mail Date: Aug. 26, 2009.
Office Action—Restriction/Election; U.S. Appl. No. 11/688,425, filed Mar. 20, 2007; First Named Inventor: David J. Winsness; Mail Date: Sep. 26, 2007.
Office Action—Restriction/Election; U.S. Appl. No. 11/122,859, filed May 5, 2005; First Named Inventor: David Fred Cantrell; Mail Date: Feb. 5, 2008.
Search Report PCT/US2005-028937 dated Aug. 15, 2008.
Search Reported dated Aug. 20, 2008.
Singh, N. et al., "Extraction of Oil from Corn Distillers Dried Grains with Soluables" Transactions of the ASAE, 1998, vol. 41(6), pp. 1775-1777.
Yokoyama et al., "Liquid Fuel Production from Ethanol Fermentation Stillage", The Chemical Society of Japan, 1986, pp. 649-652.
Adkins Energy LLC, Fourth Supplemental Invalidity Contentions; filed in the United States District Court for the Southern District of Indiana , Indianapolis Division, in re: Method of Processing Ethanol Byproducts and Related Subsystems ('858) Patent Litigation; Master Case. No. 1:10-ml-02181-LJM-DML: Associated Case No. 1:10-CV-08011-LJM-DML; filed Jul. 16, 2013, 3 pages and Certificate of Service 2 pages.
Al-Corn Clean Fuel's, Supplemental Invalidity Contentions as to the '858, '516, '517, and '484 Patents; filed in the United States District Court for the Southern District of Indiana , Indianapolis Division, in re: Method of Processing Ethanol Byproducts and Related Subsystems ('858) Patent Litigation; Master Case. No. 1:10-ml-02181-LJM-DML; Associated Case No. 1:10-cv-08004-LJM-DML; filed Jul. 16, 2013, 2 pages.
Alfa Laval, "Dep. Ex. 329; Instruction Book: Separator", BRPX 413XGD-14C-74C, 2003; 146 pgs.
Alfa Laval, "Dep. Ex. 518; Operators Manual: Separator", MiS 600 PX TGD-14CGRX, 1997; 115 pgs.
Alfa Laval Article—Date Unknown "AFPX 617" High capacity solids-ejecting centrifuge for the animal and fish processing industries 2 pgs.

(56) References Cited

OTHER PUBLICATIONS

Alther, George., Put the Breaks on Wastewater Emulsions, Chemical Engineering, Mar. 1998; pp. 82-88.
National Research Council/National Academy Press, Catalog Card No. 1-4396, "Feeding Value of Ethanol Production By-Products" 1981, 80 pgs.
Paper—Author Unknown: "Cream Separator" Website Redacted. Undated. 3 pages, Published by H. Matthews 1995-2008.
Tjardes et al., "Feedin Corn Distiller's Co-Products to Beef Cattle", Extension Extra. Aninal and Range Science. College of Agriculture and Biological Sciences/South Dakota State University, Aug. 2002; 5 pages.
Monceaux, et al., "The Alcohol Textbook", 5th Edition, published 2009, pp. 303-322.
Blue Flint Ethanol LLC, Supplemental Invalidity Contentions Regarding U.S. Patent Nos. 7,601,858; 8,008,516; 8,008,517; and 8,283,484 filed in the United States District Court for the Southern District of Indiana, Indianapolis Division, in re: Method of Processing Ethanol Byproducts and Related Subsystems ('858) Patent Litigation; Master Case. No. 1:10-m1-02181-LJM-DML; Associated Case No. 1:10-cv-8002-JLM-DML; filed Jul. 16, 2013, 5 pages and Certificate of Service 1 page.
Defendants Bushmills Ethanol, Inc., Chippewa Valley Ethanol Company LLLP, Heartland Corn Products and United Wisconsion Grain Producers, LLC, Supplemental Invalidity Contentions; filed in the United States District Court for the Southern District of Indiana , Indianapolis Division, in re: Method of Processing Ethanol Byproducts and Related Subsystems ('858) Patent Litigation; Master Case. No. 1:10-m1-02181-LJM-DML; Associated Case No. 1:10-cv-08003-LJM-DML; 1:10-cv-08004-LJM-DML, filed Jul. 16, 2013, 17 pages and Certificate of Service 1 page.
GEA Mechanical Equipment US, Inc. and Ace Ethanol LLC, Supplemental Amended Invalidity Contentions; filed in the United States District Court for the Southern District of Indiana, Indianapolis Division, in re: Method of Processing Ethanol Byproducts and Related Subsystems ('858) Patent Litigation; Master Case. No. 1:10-ml-02181-LJM-DML; Associated Case Nos. 1:10-CV-8006-LJM-DML and 1:10-CV-8007-LJM-DML ; filed Jul. 16, 2013, 6 pages and Certificate of Service 1 page.
Notice of Adoption of Amended Invalidity Contentions of Defendants ICM, Cardinal Ethanol, LLC, Big River Resources Galva, LLC, Big River Resources West Burlington, LLC and Lincolnland Agri-Energy, LLC for the '858, '516, '517, and '484 Patents; filed in the United States District Court Southern District of Indiana , Indianapolis Division, in re: Method of Processing Ethanol Byproducts and Related Subsystems ('858) Patent Litigation; Master Case. No. 1:10-ml-02181-LJM-DML; filed Jul. 16, 2013, 2 pages and Certificate of Service 1 page.
Iroquois Bio-Energy Company LLC, Preliminary Invalidity Contentions; filed in the United States District Court for the Southern District of Indiana , Indianapolis Division, in re: Method of Processing Ethanol Byproducts and Related Subsystems ('858) Patent Litigation; Master Case. No. 1:10-ml-02181-LJM-DML; Associated Case No. 1:10-cv-8005-LJM-DML; filed Jul. 16, 2013, 3 pages and Certificate of Service 1 page.
Linconlnway Energy LLC, Supplemental Invalidity Contentions; filed in the United States District Court for the Southern District of Indiana , Indianapolis Division, in re: Method of Processing Ethanol Byproducts and Related Subsystems ('858) Patent Litigation; Master Case. No. 1:10-ml-02181-LJM-DML; USDC ND Iowa Civil No. 5:10-cv-4036; filed Jul. 16, 2013, 9 pages and Certificate of Service 1 page.
Office Action—Non-Final for U.S. Appl. No. 11/856,150, filed Sep. 17, 2007; First Named Inventor: David J. Winsness; Mailing Date: Nov. 28, 2011; 14 pgs.
Notice of Allowance; U.S. Appl. No. 11/122,859, filed May 5, 2005; Mail Date: Apr. 8, 2009.
Adkins Energy LLC's Supplemental Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 1:10-cv-08011-LJM-DML; dated Mar. 30, 2012, 4 pages; Certificate of Service, 3 pages (pp. 5-7).
Al-Corn Clean Fuel Amended Answer and Affirmative Defenses to GS Cleantech's First Amended Complaint and Amended Counterclaims; filed in the United States District Court, Southern District of Indiana, Indianapolis, Division, in re: Method of Processing Ethanol Byproducts and Related Subsystems ('358) Patent Litigation; Master Case. No. 1:10-ml-02181-LJM-DML; Associated Case No. 1:10-cv-08004-LJM-DML; dated Apr. 20, 2012, 52 pages.
Al-Corn Clean Fuels, "Amended Invalidity Contentions as to the '858, '516, '517 and '484 Patents", filed in he United States District Court for the Southern District of Indiana Indianapolis Division, Case Nos. 1:10-ml-02181-LJM-DML, Associated Case No. 1:10-cv-08004-LJM-DML on Feb. 15, 2013; 114 pages including exhibits.
Amaizing Energy Holding Company, et al.,; Supplemental Preliminary Invalidity Contentions by Defendants; dated Mar. 26, 2012, 20 pgs.
Chicago Board of Trade, "Chicago Board of Trade (CBOT) SoyBean Oil Prices" graph, constantly updated, 1 pg, 2000-2009.
Blue Flint Ethanol LLC., Defendants, "Preliminary Invalidity Contentions for the '858, '516, '517 and '484 Patents", filed in the United States District Court for the Southern District of Indiana Indianapolis Division, Case Nos. 1:10-ml-02181-LJM-DML, on Feb. 11, 2013; 10 pages including certificate of service.
Blue Flint Ethanol LLC regarding US Patent No. 8,168,037; filed in the United States District Court for the Southern District of Indiana; Indianapolis Division; Preliminary Invalidity Contentions; In Re: Method of Processing Ethanol Byproducts and Related Subsystems ('858) Patent Litigation; Master Case. No. 1:10-ml-02181-LJM-DML; Associated Case No. 1:10-CV-08001-LJM-DML: dated Dec. 24, 2012; 39 pages.
Bushmills Ethanol, Inc., Defendants, "Defendants Bushmills Ethanol, Inc., Chippewa Valley Ethanol Company LLLp, Heartland Corn Products and United Wisconsin Grain Products, LLC's Second Amended Preliminary Invalidity Contentions", filed in the United States District Court for the Southern District of Indiana Indianapolis Division, Case No. 1:10-ml-02181-LJM-DML, Associated Case No. 1:10-cv-08003-LJM-DML, Associate Case No. 1:10-cv-08004-LJM-DML, on Feb. 11, 2013; 253 pages including certificate of service and exhibits.
GEA Mechanical Equipment US, Inc. and ACE Ethanol LLC., "Amended Invalidity Contentions for the '858, '516, '517 and '484 Patents", filed in he United States District Court for the Southern District of Indiana Indianapolis Division, Case Nos. 1:10-ml-02181-LJM-DML, on Feb. 11, 2013; 368 pages including certificate of service and exhibits.
*GS Cleantech Corporation*; Plaintiff v. *Adkins Energy, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 242; Case 1:10-ml-02181-LJM-DML 10 pgs.
*GS Cleantech Corporation*; Plaintiff vs. *Amaizing Energy, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 233; Case 1:10-ml-02181-LJM-DML 12 pgs.
*GS CleanTech Corporation*; Plaintiff vs. *Big River Resources Galva, LLC and Big River Resources West Burlington, LLC* Defendants; "First Amended Complaint for Patent Infringement"; filed in the United States District Court for the Southern District of Indiana, Master Case No. 1:10-ml-2181-LJM-DML, on Feb. 27, 2012, Document 235; Case 1:10-ml-02181-LJM-DML 11 pgs.
*GS Cleantech Corporation*; Plaintiff v. *Big River Resources Galva, LLC and Big River Resources West Burlington, LLC*, Defendants; "Answer of Big River Resources Galva, LLC and Big River Resources West Burlington, LLC to Plaintiff GS CleanTech Corporations's First Amended Complaint for Patent Infringement"; filed in the United States District Court for the Southern District of Indiana, Master Case No. 1:10-ml-2181-LJM-DML, on Mar. 15, 2012, Document 260; Case 1:10-ml-02181-LJM-DML 11 pgs.

(56) References Cited

OTHER PUBLICATIONS

*GS Cleantech Corporation*; Plaintiff vs. *Blue Flint Ethanol, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 238; Case 1:10-ml-02181-LJM-DML 10 pgs.

*GS CleanTech Corporation*; Plaintiff v. *Bushmills Ethanol, Inc.*, Defendant; "First Amended Complaint for Patent Infringement"; filed in the United States District Court for the Southern District of Indiana, Master Case No. 1:10-ml-2181-LJM-DML, on Feb. 27, 2012, Document 243; Case 1:10-ml-02181-LJM-DML 14 pgs.

*GS CleanTech Corporation*; Plaintiff v. *Cardinal Ethanol, LLC*, Defendant; "Answer of Cardinal Ethanol, LLC to Plaintiff GS CleanTech Corporation's First Amended Complaint for Patent Infringement"; filed in the United States District Court for the Southern District of Indiana, Master Case No. 1:10-ml-2181-LJM-DML, on Mar. 15, 2012, Document 261; Case 1:10-ml-02181-LJM-DML 11 pgs.

*GS CleanTech Corporation*; Plaintiff vs. *Flotwegg Separation Technology, Inc.*, Defendant; "Second Amended Complaint for Patent Infringement"; filed in the United States District Court for the Southern District of Indiana, Master Case No. 1:10-ml-2181-LJM-DML, on Feb. 27, 2012, Document 237; Case 1:10-ml-02181-LJM-DML 12 pgs.

*GS CleanTech Corporation*; Plaintiff v. *Iroquois Bio-Energy Company, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 240; Case 1:10-ml-02181-LJM-DML 10 pgs.

*GS CleanTech Corporation*; Plaintiff vs. *Iroquois Bio-Enery Company, LLC*, Defendant; Iroquois Bio-Energy Company, LLC's Answer and Affirmative Defenses to GS CleanTech Corporation's First Amended Complaint for Patent Infringement; filed in the United States District Court for the Southern District of Indiana, Master Case No. 1:10-ml-2181-LJM-DML, on Mar. 15, 2012, Document 259; Case 1:10-ml-02181-LJM-DML 11 pgs.

*GS CleanTech Corporation*; Plaintiff v. *Lincolnland Agri-Energy, LLC*, Defendant; "Second Amended Complaint for Patent Infringement"; filed in the United States District Court for the Southern District of Indiana, Master Case No. 1:10-ml-2181-LJM-DML, on Feb. 27, 2012, Document 241; Case 1:10-ml-02181-LJM-DML 10 pgs.

*GS CleanTech Corporation*; Plaintiff v. *Lincolnland Agri-Energy, LLC*, Defendant; "Answer of Lincolnland Agri-Energy, LLC to Plaintiff GS CleanTech Corporation's Second Amended Complaint for Patent Infringement"; filed in the United States District Court for the Southern District of Indiana, Master Case No. 1:10-ml-2181-LJM-DML, on Mar. 15, 2012, Document 262; Case 1:10-ml-02181-LJM-DML 10 pgs.

*GS Cleantech Corporation*; Plaintiff v. *United Wisconsin Grain Producers, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 239; Case 1:10-ml-02181-LJM-DML 10 pgs.

ICM, Inc., David Vander Griend, Cardinal Ethanol, LLC, Big River Resources Galva, LLC, Big River Resources WEst Burlington, LLC and Lincolnland Agri-Energy, LLC., Defendants, "Amended Invalidity Contentions for the '858, '516, '517 and '484 Patents", filed in the United States District Court for the Southern District of Indiana Indianapolis Division, Case No. 1:10-ml-02181-LJM-DML, on Feb. 11, 2013; 10 pages including certificate of service.

ICM Inc, and ICM-related Ethanol Plant Defendants Memorandum in Support of Their Motion for Summary Judgment of Non-Infringement; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 23, 2012, 25 pages; Certificate of Service, 1 page (p. 26).

*ICM*; Plaintiff vs. *GS CleanTech Corporation*, Defendant; "Fourth Amended Complaint for Declaratory Judgement Jury Trial Requested"; filed in the United States District Court for the Southern District of Indiana, Master Case No. 1:10-ml-2181-LJM-DML, on Mar. 15, 2012, Document 255; Case 1:10-ml-02181-LJM-DML 10 pgs.

Iroquois Bio-Engergy Company, LLC, "Amended Invalidity Contentions for the '858, '516, '517 and '484 Patents", filed in the United States District Court for the Southern District of Indiana Indianapolis Division, Case No. 1:10-ml-02181-LJM-DML, on Feb. 11, 2013; 45 pages including exhibits.

Iroquois Bio-Energy Company LLC., Memorandum in Support of its Motion for Summary Judgment of Non-Infringement; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Document No. 362; dated May 23, 2012, 27 pages; Certificate of Service, 1 page (pp. 28).

Linconlway Energy's Supplemental Claim Chart re: Claims 8 & 9 Invalidity Contentions, filed with the Supplemental Invalidty Contentions in the United States District Court for the Southern District of Indiana Indianapolis Divsion, Case No. 1:10-ml-2181-LJM-DML, related to USDC ND Iowa Civil No. 5:10-cv-4036, on Feb. 11, 2013; 10 pages.

Lincolnway Energy LLC Preliminary Invalidity Contentions regarding US Patent No. 8,168,037; filed in the United States District Court for the Southern District of Indiana; Indianapolis Division; In Re: Method of Processing Ethanol Byproducts and Related Subsystems ('858) Patent Litigation; Master Case. No. 1:10-ml-02181-LJM-DML; Associated Case No. 1:10-CV-08001-LJM-DML: dated Dec. 24, 2012; 46 pages.

Notice of Allowance for U.S. Appl. No. 12/559,136, filed Sep. 14, 2009; First Named Inventor: David Fred Cantrell; Mailing Date: Jan. 21, 2011.

Notice of Allowance for U.S. Appl. No. 13/107,197, filed May 13, 2011; First Named Inventor: David Fred Cantrell; Mailing Date: Apr. 13, 2012; 5 pgs.

Notice of Allowance for U.S. Appl. No. 12/559,136, filed Sep. 14, 2009; First Named Inventor: David Fred Cantrell; Mailing Date: Jun. 24, 2011.

Notice of Allowance for U.S. Appl. No. 11/241,231, filed Sep. 30, 2005; Inventor: David Fred Cantrell; Mailing Date: Jul. 22, 2011; 9 pages.

Notice of Allowance for U.S. Appl. No. 13/107,197, filed May 13, 2011; First Named Inventor: David Fred Cantrell; Date of Mailing: Sep. 4, 2012; 9 pgs.

Notice of Allowance for U.S. Appl. No. 11/856,150, filed Sep. 17, 2007; First Named Inventor: David J. Winsness; Mailing Date: Dec. 21, 2011; 8 pgs.

Office Action—Advisory Action for U.S. Appl. No. 11/908,891, filed Sep. 17, 2007; First Named Inventor: David J. Winsness; Mailing Date: May 31, 2012; 5 pgs.

Office Action—Final for U.S. Appl. No. 11/908,891, filed Sep. 17, 2007; First Named Inventor: David J. Winsness; Mailing Date: Mar. 21, 2012.

Office Action—Final issued in U.S. Appl. No. 11/908,891 dated May 9, 2013; 25 pages.

Office Action—Final for U.S. Appl. No. 13/450,991, filed Apr. 19, 2012; First Named Inventor: David J. Winsness; Mailing Date May 31, 2013; 16 pages.

Office Action—Final for U.S. Appl. No. 11/908,891, filed Sep. 17, 2007; First Named Inventor: David J. Winsness; Mailing Date: Nov. 23, 2011; 16 pgs.

Office Action—Final; U.S. Appl. No. 11/241,231, filed Sep. 30, 2005; Inventor David Fred Cantrell; Mail Date: Dec. 26, 2008; 10 pgs.

Office Action—Non-Final for U.S. Appl. No. 13/450,997, filed Apr. 19, 2012; First Named Inventor: David Fred Cantrell; mailed Feb. 21, 2013; 27 pgs.

Office Action—Non-Final for U.S. Appl. No. 12/559,136, filed Sep. 14, 2009; First Named Inventor: David Fred Cantrell; Mailing Date: Apr. 2, 2010; 17 pgs.

(56) References Cited

OTHER PUBLICATIONS

Office Action—Non-Final; U.S. Appl. No. 11/856,150, filed Sep. 17, 2007, Inventor David J. Winsness, Mail Date: Aug. 28, 2009; 13 pgs.
Office Action—Non-Final for U.S. Appl. No. 11/908,891, filed Sep. 17, 2007; First Named Inventor: David J. Winsness; Mailing Date: Nov. 26, 2012.
Amendment to Final Office Action Filed in U.S. Appl. No. 11/908,891 on Nov. 8, 2013; 14 pages.
Matthews, H., Hanys Old Engine, De Laval Separator Company, A bit of history and development of DeLaval milers, 1995-2008, DeLaval Separator Company, 10 pages.
Request for Continued Examination Filed in U.S. Appl. No. 11/908,891 on Nov. 8, 2013; 3 pages.
Adkins Energy, LLC, Defendants, "Second Supplemental Preliminary Invalidity Contentions", filed in the United States District Court for the Southern District of Indiana Indianapolis Division, Case Nos. 1:10-ml-0218-LJM-DML and 1:10-CV-08011-LJM-DML, on Oct. 15, 2012, 17 ppages including certificate of service.
Defendants', Bushmills Ethanol, Inc., Chippewa Valley Ethanol Company, LLLP, Heartland Corn Products and United Wisconsin Grain Producers LLC, Amended Preliminary Invalidity Contentions; filed in the United States District Court; Southern District of Indiana; Indianapolis Division; In Re: Method of Processing Ethanol Byproducts and Related Subsystems (858) Patent Litigation; Master Case No. 1:10-ml-02181-LJM-DML; dated Oct. 15, 2012; 12 pages.
GEA Mechanical Equipment US, Inc. and Ace Ethanol LLC.'s Preliminary Invalidity Contentions, filed in the United States District Court for the Southern District of Indiana; Indianapolis Division; In Re: Method of Processing Ethanol Byproducts and Related Subsystems ('858) Patent Litigation; 1:10-ml-02181-LJM-DML; filed Oct. 15, 2012; 140 pages.
Lincolnway Energy LLC Preliminary Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 5:10-cv-4036; filed Oct. 15, 2012, 17 pages; Exhibit A, pp. 3 pages and Exhibit B, 4 pages, ( pp. 275-278).
Preliminary Invalidity Contentions of Defendants ICM, Inc., Cardinal Ethanol, LLC, Big River Resources Galva, LLC, Big River Resources West Burlington, LLC and Lincolnland Agri-Energy, LLC, for the '516 and' 517 Patents; filed in the United States District Court; Southern District of Indiana; Indianapolis Division; In Re: Method for Processing Ethanol Byproducts and Related Subsystems ('858) Patent Litigation; 1:10-ml-02181-LJM-DML; dated Oct. 15, 2012, 10 pages.
Non-Final Office Action issued in U.S. Appl. No. 13/450,991 dated Nov. 16, 2012; 27 pages.
Blue Flint Ethanol, LLC's Amended Preliminary Invalidity Contentions; filed in the United States District Court; Southern District of Indiana; Indianapolis Division; In Re: Method or Processing Ethanol Byproducts and Related Subsystems ('858') Patent Litigation; Case No. 1:10-ml-02181-LJM-DML, Associated Case No. 1:10-cv-8002-LJM-DML; dated Sep. 17, 2013; 2 pages.
Peliminary Invalidity Contentions by Lincolnway Energy LLC; filed in the United States District Court; Southern District of Indiana; Indianapolis Division; In Re: Method or Processing Ethanol Byproducts and Related Subsystems ('858') Patent Litigation; Case No. 1:10-ml-2181-LJM-DML, USDC ND Iowa Civil No. 5:10-cv-4036; dated Sep. 17, 2013; 31 total pages ('037 Patent Further Amended & Supplemented Invalidity Claim Chart) included.
Office Action issued in Canadian Patent Application No. 2,576,895, dated Oct. 18, 2012; 3 pages.
GS Cleantech Corporation's Motion for Summary Judgment of Infringement of U.S. Patent No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 980.

[Corrected] Memorandum of Law in Support of Defendants' Joint Motion for Summary Judgment of Invalidity and to Dismiss Plaintiff's Request for provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 4, 2013; 138 pages, Document No. 970-1.
Declaration of Michael Rye in Support of GS Cleantech Corporation's Consolidated Reply in Support of its Motion for Summary Judgment of Infringement and Opposition to Individual Defendants' Motions for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 3, 2013; 7 pages, Document No. 1036.
Declaration of Michael Rye in Support of Plaintiffs' Memorandum in Opposition to Defendants' Joint Motion for Summary Judgment of Invalidity and to Dismiss Plaintiffs' Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 3, 2013; 7 pages, Document No. 1039.
Declaration of Michael Rye in Opposition to ICM's Request for Reimbursement of Costs and Attorneys Fees, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 25, 2013; 5 pages, Document No. 1033.
Declaration of Chad A. Denver in Support of GS Cleantech Corporation's Memorandum of Law in Support of Its Motions for Summary Judgment of Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 6 pages, Document No. 990.
Defendants' Unopposed Motion for Leave to File a Corrected memorandum of Law in Support of Defendants' Joint Motion for Summary Judgment of Invalidity, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 4, 2013; 3 pages, Document No. 970.
Plaintiff's GS Cleantech Corporation Cross Motion for Summary Judgment of No Invalidity Under 35 U.S.C. § 112 Against Hearland Corn Products, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; date Nov. 22, 2013; 3 pages, Document No. 1008.
GS Cleantech Corporation's Memorandum of Law in Support of Its Motions for Summary Judgment of Infringement by the '037 Plant Defendants, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 42 pages, Document No. 989.
Plaintiff's Brief in Opposition to Defendants Ametis, Inc. and Aemetis Advanced Fuels Keyes, Inc.'s Motion for Suggestion for Remand, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 7, 2013; 8 pages, Document No. 971.
Memorandum of Law in Support of Defendants' Joint Motion for Summary Judgment of Invalidity and to Dismiss Plaintiff's Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Liti-

(56) References Cited

OTHER PUBLICATIONS gation; Master Case. No. 1:10-ml-02181-LJM-DML; dated Sep. 24, 2013; 139 pages, Document No. 948.

Plaintiff's GS Cleantech Corporation Cross Motion for Summary Judgment of No Invalidity Under 35 U.S.C. § 112 Against GEA Mechanical Equipment US, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1021.

Plaintiff's GS Cleantech Corporation Cross Motion for Summary Judgment of No Invalidity Under 35 U.S.C. § 112 Against ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1022.

Plaintiff's GS Cleantech Corporation Cross Motion for Summary Judgment of No Invalidity Under 35 U.S.C . § 112 Against David J. Vander Griend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1024.

Plaintiff's GS Cleantech Corporation Cross Motion for Summary Judgment of No Invalidity Under 35 U.S.C. § 112 Against Iroquois Bio-Energy Company, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1020.

GS Cleantech Corporation's Memorandum of Law in Opposition to Defendants' Motion to Compel Testimony of Peter Hagerty, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 25, 2013; 12 pages, Document No. 993.

GS Cleantech Corporation's Motion for Summary Judgment of Infringement of U.S. Patent No. 8,168.037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 985.

Plaintiff's Memorandum in Opposition to Defendants' Joint Motion for Summary Judgment of Invalidity and to Dismiss Plaintiffs' Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 150 pages, Document No. 1030.

Defendants' Motion to Compel Proper Responsive Deposition Testimony of Peter Hagerty RE: U.S. Patent No. 8,168,037 Litigation, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 11, 2013; 3 pages, Document No. 975.

Notice of Expert Report Service and Request for Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 16, 2013; 2 pages, Document No. 1059.

Adkins's Combined Memorandum of Law Stating Adkins-Specific Arguments in Opposition to Cleantech's Motion for Summary Judgment of Infringement and in Support of Adkins's Motion for Summary Judgment on Unclean Hands, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 17 pages, Document No. 946.

GS Cleantech Corporation's Consolidated Reply Memorandum in Support of Its Motion for Summary Judgment of Infringement and Opposition to Individual Defendants' Motions for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 25, 2013; 77 pages, Document No. 1032.

Defendants Aemetis Inc., and Aemetis Advanced Fuels Keyes, Inc.'s Reply to Plaintiff's Resistance to Motion for Suggestion for Remand, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 17, 2013; 7 pages, Document No. 979.

Pacific Ethanol, Inc.'s Final Invalidity Contentions, filed in the United States District Court, Southern District of Indiana, Indianapolis, Division, in re: Method of Processing Ethanol Byproducts and Related Subsystems ('858) Patent Litigation; Master Case. No: 1:10-ml-02181-LJM-DML; dated Aug. 22, 2014; 42 pages, including Certificate of Service.

Pacific Ethanol Stockton, LLC's Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Homeland Energy Solutions, LLC's Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Aemetis Inc.'s Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Aemetis Advanced Fuels Keyes, Inc.'s Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Motion to Quash Subpoena of Dennis Vander Griend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 15, 2014; 2 pages, including Certificate of Service, Document No. 1288.

Memorandum of Law in Support of Motion to Quash Subpoena of Dennis Vander Griend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 15, 2014; 7 pages, including Certificate of Service, Document No. 1289.

Tag-Along Defendants Aemetis, Inc et al., Brief in Support of Motion to Strike Plaintiff's Newly Asserted Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 17, 2014; 14 pages, including Certificate of Service, Document No. 1292.

Tag-Along Defendants Aemetis, Inc et al., Motion to Strike Plaintiff's Newly Asserted Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-

(56) References Cited

OTHER PUBLICATIONS ml-02181-LJM-DML; dated Sep. 17, 2014; 6 pages, including Certificate of Service, Document No. 1291.
Joint Proposed Agenda, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 16, 2014; 6 pages, Document No. 1290.
Tag-Along Defendants Aemetis, Inc et al., Motion to Strike Plaintiff's Newly Asserted Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 18, 2014; 6 pages, including Certificate of Service, Document No. 1293.
Tag-Along Defendants Aemetis, Inc et al., Brief in Support of Motion to Strike Plaintiff's Newly Asserted Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 18, 2014; 14 pages, including Certificate of Service, Document No. 1294.
Notice of Filing Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 18, 2014; 3 pages, including Certificate of Service, Document No. 1295.
Order and Entry from Telephone Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2014; 3 pages, Document No. 1297.
Notice of Written Consent to Correct and/or Amend the Complaints Against Guardian Energy, LLC,et al., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 30, 2014; 3 pages, including Certificate of Service, Document No. 1298.
Second Amended Complaint for Patent Infringement Against Guardian Energy, LLC and ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 30, 2014; 16 pages, including Certificate of Service, Document No. 1299.
Second Amended Complaint for Patent Infringement Against Western New York Energy, LLC and ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 30, 2014; 16 pages, including Certificate of Service, Document No. 1301.
Second Amended Complaint for Patent Infringement Against Southwest Iowa Renewable Energy, LLC and ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 30, 2014; 16 pages, including Certificate of Service, Document No. 1300.
First Amended Complaint for Patent Infringement Adding Defendant ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 30, 2014; 14 pages, including Certificate of Service, Document No. 1302.
Plaintiffs' Memorandum in Opposition to Defendants' Joint Motion for Summary Judgment of Invalidity and to Dismiss Plaintiffs' Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 150 pages, Document No. 1031.
Supplemental Protective Order, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 20, 2013; 5 pages, Document No. 1066.
Joint Proposed Agenda, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 30, 2013; 4 pages, Document No. 1069.
Order to Show Cause, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 10, 2014; 2 pages, Document No. 1076.
Iroquois Reply on Its Separate Cross Motion for Summary Judgment on Claim 9 of the '516 Patent and for Partial Summary Judgment on Claim 2 of the '516 Patent and Claim 14 of the '484 Patent, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 16, 2014; 6 pages, Document No. 1080.
Order Granting Defendant GEA's Unopposed Motion for Additional Pages, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 1 page, Document No. 1081.
Adkins's Motion to Seal Its Reply Memorandum in Support of Its Motion for Summary Judgment on Unclean Hands, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 2 pages, Document No. 1083.
Lincolnway Energy's Reply on Separate Motion for Summary Judgment on Claim 9 of the '516 Patent, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 9 pages, Document No. 1088.
GEA Mechanical Equipment US Inc.'s Motion for Oral Argument on Its Motions for Summary Judgment on the Issue of Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 1 page, Document No. 1089.
Notice of Withdrawal of Maralee Eriksen and the Law Firm of Boutin Jones, Inc. as Attorneys of Record for Defendant Pacific Ethanol, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 5 pages, Document No. 1090.
Sealed Designation of Evidence in Support of Lincolnway Energy, LLC's Reply on Separate Motion for Summary Judgment on Claim 9 of the '516 Patent, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 3 pages, Document No. 1091.
Defendants' Reply in Support of Defendants' Joint Motion for Summary Judgment of Invalidity and to Dismiss Plaintiff's Request for

(56) References Cited

OTHER PUBLICATIONS

Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 107 pages, Document No. 1093.
Defendants' Opposition to Plaintiff GS Cleantech Corporation's Cross Motion for Summary Judgment of No Invalidity Under 35 U.S. C. § 112 Against Defendants (Master Docket Nos. 1005, 1008-1024), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 5 pages, Document No. 1094.
Defendants' Joint Motion for Oral Argument on Motions for Summary Judgment of Non-Infringement and Invalidity and to Dismiss Plaintiff's Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 5 pages, Document No. 1095.
Reply Memorandum in Support of Defendants' Motion for Summary Judgment of Non-Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 37 pages, Document No. 1096.
Designation of Evidence for Exhibits Supporting Reply Memorandum in Support of Defendants' Motion for Summary Judgment of Non-Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 3 pages, Document No. 1097.
Iroquois Bio-Energy's Brief Supplemental Filing of Inadvertently Omitted Argument in Defendants' Joint Reply Memorandum in Support of Defendants' Motion for Summary Judgment of Non-Infringement (Docket #1096), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 3 pages, Document No. 1100.
Motion to Withdraw as Co-Counsel, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 21, 2014; 3 pages, Document No. 1101.
Affidavit of Ken M. Peterson Establishing Notice Requirements for Withdrawal of Counsel, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 21, 2014; 5 pages, Document No. 1102.
Answer of Little Sioux Corn Processors, LLLP to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 21, 2014; 14 pages, Document No. 1105.
Answer of Guardian Energy, LLC's to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No: 1:10-ml-02181-LJM-DML; dated Jan. 21, 2014; 14 pages, Document No. 1106.
Answer of Western new York Energy, LLC to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 21, 2014; 14 pages, Document No. 1107.
Answer of Southwest Iowa Renewable Energy, LLC to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 21, 2014; 14 pages, Document No. 1108.
Adkins's Reply Memorandum in Support of Its Motion for Summary Judgment on Unclean Hands, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 21, 2014; 15 pages, Document No. 1109.
Rule 7.1 Disclosure Statement of Defendant Western New York Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 22, 2014; 2 pages, Document No. 1111.
Rule 7.1 Disclosure Statement of Defendant Southwest Iowa Renewable Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 22, 2014; 2 pages, Document No. 1113.
Rule 7.1 Disclosure Statement of Defendant Little Sioux Corn Processors, LLLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 22, 2014; 2 pages, Document No. 1115.
Rule 7.1 Disclosure Statement of Defendant Guardian Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 22, 2014; 2 pages, Document No. 1118.
Tag-Along Defendants Aemetis, Inc., Aemetis Advanced Fuels Keyes, Inc., Homeland Energy Solutions, LLC and Pacific Ethanol, Inc.'s Response to the Court's Order to Submit Written Objections to the Court's Case Management Deadlines, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2014; 5 pages, Document No. 1119.
Tag-Along Defendants Aemetis, Inc., Aemetis Advanced Fuels Keyes, Inc., Homeland Energy Solutions, LLC and Pacific Ethanol, Inc.'s Response to Order to Show Cause, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2014; 6 pages, Document No. 1121.
GS Cleantech's Response to Minute Entry and Order (MDN 1084), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2014; 4 pages, Document No. 1123.
GS Cleantech Corporation's Surreply in Support of Plaintiff's Motions for Summary Judgment of Infringement by Plant Defendants, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 18, 2014; 14 pages, Document No. 1137.
GS Cleantech Corporation's Surreply in Response to Defendants' Joint Reply in Support of Their Motion for Summary Judgment of Invalidity, filed in the United States District Court, Southern District

(56) References Cited

OTHER PUBLICATIONS of Indiana, Indianapolis, Division, in re: Method of Processing Ethanol Byproducts and Related Subsystems ('858) Patent Litigation; Master Case. No: 1:10-ml-02181-LJM-DML; dated Feb. 18, 2014; 7 pages, Document No. 1138.
Plaintiff GS Cleantech Corporation's Reply in Support of Its Cross Motion for Summary Judgment of No Invalidity Under 35 U.S.C. § 112, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 18, 2014; 8 pages, Document No. 1139.
Joint Proposed Agenda, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 20, 2014; 5 pages, Document No. 1140.
Supplemental Agenda Item, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 24, 2014; 4 pages, Document No. 1141.
Plaintiff GS Cleantech Corporation's Cross Motion for Summary Judgment of No Invalidity Under 35 U.S.C. § 102(e) Against Big River Resources Galva, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 18, 2014; 2 pages, Document No. 1142.
Plaintiff GS Cleantech Corporation's Cross Motion for Summary Judgment of No Invalidity Under 35 U.S. C. § 112 Against Big River Resources Galva, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1143.
Plaintiff GS Cleantech Corporation's Cross Motion for Summary Judgment of No Invalidity Under 35 U.S. C § 112 Against Big River Resources West Burlington, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1144.
Plaintiff GS Cleantech Corporation's Cross Motion for Summary Judgment of No Invalidity Under 35 U.S. C. § 112(e) Against Big River Resources West Burlington, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1145.
Plaintiff GS Cleantech Corporation's Cross Motion for Summary Judgment of No Invalidity Under 35 U.S. C. § 112(e) Against Blue Flint Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1146.
Plaintiff GS Cleantech Corporation's Cross Motion for Summary Judgment of No Invalidity Under 35 U.S. C. § 112 Against Blue Flint Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1147.
Plaintiff GS Cleantech Corporation's Cross Motion for Summary Judgment of No Invalidity Under 35 U.S. C. § 112 Against Cardinal Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1148.
Plaintiff GS Cleantech Corporation's Cross Motion for Summary Judgment of No Invalidity Under 35 U.S. C. § 102(e) Against Cardinal Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1149.
Plaintiff GS Cleantech Corporation's Cross Motion for Summary Judgment of No Invalidity Under 35 U.S. C. § 102(e) Against Lincolnland Agri-Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1150.
Plaintiff GS Cleantech Corporation's Cross Motion for Summary Judgment of No Invalidity Under 35 U.S. C. § 112 Against Lincolnland Agri-Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1151.
Plaintiff GS Cleantech Corporation's Cross Motion for Summary Judgment of No Invalidity Under 35 U.S. C. § 112 Against Lincolnway Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1152.
Lincolnway Energy, LLC., Defendants, "Memorandum in Support of Defendants Lincolnway Energy, LLC et. al., Joint Motion for Summary Judgment of Invalidity and Noninfringement of U.S. Patent No. 8,168,037 and in Opposition to Plaintiff's Motion for Summary Judgment of Infringement ", filed in the United States District Court for the Southern District of Indiana Indianapolis Division, Case No. 1:10-ml-02181-LJM-DML, on Dec. 31, 2013; 48 pages.
Ace Ethanol LLC, et al., Memorandum of Law in Support of Motions for Summary Judgment of Non-Infringement filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 29, 2012, filed Jul. 3, 2012; 35 pages, Document No. 398; Certificate of Service, 3 pages (pp. 36-38), Appendix A, 4 pages (pp. 39-42).
ICM, Inc., et al., Preliminary Invalidity Contentions regarding US Patent No. 8,168,037; filed in the United States District Court for the Southern District of Indiana; Indianapolis Division; In Re: Method of Processing Ethanol Byproducts and Related Subsystems ('858) Patent Litigation; Master Case. No. 1:10-ml-02181-LJM-DML: Associated Case No. 1:10-CV-08001-LJM-DML; dated Dec. 24, 2012; 9 pages.
Search Report issued in International Application No. PCT/US07/62301; Applicant: GS Industrial Design Inc., Date of Mailing Mar. 11, 2008; 12 pages.
Order Setting Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 2, 2014; 1 page, Document No. 1303.
Plaintiff's Motion to File Its Opposition to Defendant's Motion to Quash the Subpoena of Dennis Vander Griend and Certain Exhibits Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 2, 2014; 3 pages including Certificate of Service, Document No. 1307.
Exhibit 10, Plaintiffs' Updated Privilege Log, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 2, 2014; 73 pages, Document No. 1309.

(56) References Cited

OTHER PUBLICATIONS

Plaintiff's Motion to File Its Designation of Evidence and Certain Exhibits in Support of Its Opposition to Defendant's Motion to Strike Plaintiff's Final Infringement Contentions Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 6, 2014; 3 pages including Certificate of Service, Document No. 1312.

Plaintiff's Opposition to Defendants' Motion to Quash the Subpoena of Dennis Vander Griend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 2, 2014; 7 pages including Certificate of Service, Document No. 1306.

Motion to File Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 3, 2014; 3 pages, Document No. 1308.

Plaintiff's Opposition to Defendants' Motion to Strike Plaintiff's Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 6, 2014; 15 pages including Certificate of Service, Document No. 1310.

Plaintiffs' Notice of Service of Experts' Reports in Tag-Along Cases, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 8, 2014; 4 pages including Certificate of Service, Document No. 1313.

Tag-Along Defendants Aemetis, Inc et al., Reply to Plaintiff's Opposition to Motion to Strike Plaintiff's Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 13, 2014; 12 pages including Certificate of Service, Document No. 1316.

Reply in Support of Motion to Quash Subpoena of Dennis Vander Griend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 14, 2014; 3 pages including Certificate of Service, Document No. 1317.

Plaintiff GS Cleantech Corporation's Cross Motion for Summary Judgment of No Invalidity Under 35 U.S. C. § 102(e) Against Lincolnway Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1153.

Plaintiff GS Cleantech Corporation's Cross Motion for Summary Judgment of No Invalidity Under 35 U.S. C. § 102(e) Against Flottweg Separation Technology, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1154.

Plaintiff GS Cleantech Corporation's Cross Motion for Summary Judgment of No Invalidity Under 35 U.S. C. § 112 Against Flottweg Separation Technology, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1155.

Plaintiff GS Cleantech Corporation's Cross Motion for Summary Judgment of No Invalidity Under 35 U.S. C. § 112 Against David Vandergriend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1156.

Plaintiff GS Cleantech Corporation's Cross Motion for Summary Judgment of No Invalidity Under 35 U.S. C. § 102(e) Against David Vandergriend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1157.

Plaintiff GS Cleantech Corporation's Cross Motion for Summary Judgment of No Invalidity Under 35 U.S. C. § 102(e) Against ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1158.

Plaintiff GS Cleantech Corporation's Cross Motion for Summary Judgment of No Invalidity Under 35 U.S. C. § 112 Against ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1159.

Stipulation Regarding Claim Construction Arguments and the Tag-Along Defendants, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 14, 2014; 3 pages, Document No. 1162.

Plaintiff GS Cleantech Corporation's Motion to Amend the Scheduling Order for Tag-Along Cases to Extend the Deadline for Motions to Amend Pleadings, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 18, 2014; 4 pages, Document No. 1164.

[Corrected] Memorandum of Law in Support of Defendants' Joint Motion for Summary Judgment of Invalidity and to Dismiss Plaintiff's Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 27, 2014; 139 pages, Document No. 1174.

Tag-Along Defendants' Resistance to GS Cleantech Corporation's Motion to Amend the Scheduling Order for Tag-Along Cases to Extend the Deadline for Motions to Amend Pleadings, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 1, 2014; 5 pages, Document No. 1176.

Plaintiff GS Cleantech Corporation's Reply to Tag-Along's Resistance to Cleantech's Motion to Amend the Scheduling Order for Tag-Along Cases to Extend the Deadline for Motions to Amend Pleadings, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 11, 2014; 5 pages, Document No. 1178.

Joint Reply in Support of Defendants' Motion for Summary Judgment of Invalidity and Nonlnfringement of U.S. Patent No. 8,168,037 and Surreply in Response to Plaintiff's Motion for Summary Judgment of Infringement of U.S. Patent No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 14, 2014; 18 pages, Document No. 1179.

(56) References Cited

OTHER PUBLICATIONS

Defendants' Joint Motion for Oral Argument on Motions for Summary Judgment of Non-Infringement and invalidity of U.S. Patent No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 14, 2014; 3 pages, Document No. 1180.
GS Cleatech Corporation's Surreply in Response to Defendants' Joint Reply in Support of Defendants' Motion for Summary Judgment of Invalidity and NonInfringement of U.S. Patent No. 8,168,037 and Surreply in Response to Plaintiff's Motion for Summary Judgment of Infringement of U.S. patent No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 24, 2014; 8 pages, Document No. 1184.
Plaintiff GS Cleantech Corporation's Motion to Amend the Scheduling order for Tag-Along Cases to Extend the Deadlines (With Partial Assent), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 13, 2014; 5 pages, Document No. 1194.
Answer of Pacific Ethanol Magic Valley, LLC to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 28, 2014; 16 pages, Document No. 1195.
Answer of ICM, Inc. to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 28, 2014; 16 pages, Document No. 1196.
Opposition to Plaintiff's Motion to Amend the Scheduling Order for Tag-Along Cases to Extend the Deadlines, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 28, 2014; 5 pages, Document No. 1197.
Rule 7.1 Disclosure Statement of Defendant Pacific Ethanol Magic Valley, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 30, 2014; 2 pages, Document No. 1198.
Rule 7.1 Disclosure Statement of Defendant ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 30, 2014; 2 pages, Document No. 1199.
Defendant David Vander Griend's Motion to Dismiss for Lack of Personal Jurisdiction, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 2, 2014; 2 pages, Document No. 1201.
Pacific Ethanol Stockton, LLC, Answer and Counterclaims., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 4, 2014; 21 pages, Document No. 1205.
Memorandum of Law in Support of Defendant David Vander Griend's Motion to Dismiss for Lack of Personal Jurisdiction, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 2, 2014; 9 pages, Document No. 1202.
Rule 7.1 Disclosure Statement of Defendant Pacific Ethanol Stockton, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 4, 2014; 5 pages, Document No. 1206.
Tag-Along Defendants' Notice of Service of Experts' Reports, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 10, 2014; 6 pages, Document No. 1212.
Stipulation Regarding Claim Construction Arguments and the Tag-Along Defendants, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 13, 2014; 3 pages, Document No. 1213.
GS Cleantech Corporation's Answer to Homeland Energy Solutions, LLC's Counterclaims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 13, 2014; 6 pages, Document No. 1214.
Defendants' Supplemental Brief in Support of Summary Judgment of Invalidity for Indefiniteness Pursuant to the Court's Order Requiring Briefing of Impact of *Nautilus, Inc. V. Biosig Instruments, Inc.*, 572 U.S.__(Jun. 2, 2014), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 13, 2014; 8 pages, Document No. 1215.
GS Cleantech Corporation's Opposition to Defendant David Vander Griend's Motion to Dismiss for Lack of Personal Jurisdiction, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 19, 2014; 9 pages, Document No. 1224.
Motion to Withdraw as Counsel for Defendants GEA Mechanical Equipment US, Inc. and Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 19, 2014; 2 pages, Document No. 1225.
Plaintiff's Response to Defendants' Supplemental Brief in Support of Summary Judgment of Invalidity for Indefiniteness Under 35 U.S.C. § 112, ¶2, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 20, 2014; 6 pages, Document No. 1226.
Plaintiff's Motion to Amend the Complaint Against Guardian Energy, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 20, 2014; 3 pages, Document No. 1228.
Plaintiff's Memorandum of Law in Support of Its Motion to Amend the Complaint Against Guardian Energy, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 20, 2014; 8 pages, Document No. 1229.
Assented-to-Motion for Leave to Amend Complaint Against Aemetis, Inc. and Aemetis Advanced Fuels Keyes, Inc., filed in the United States District Court, Southern District of Indiana, Indianapo-

(56) References Cited

OTHER PUBLICATIONS lis, Division, in re: Method of Processing Ethanol Byproducts and Related Subsystems ('858) Patent Litigation; Master Case. No. 1:10-ml-02181-LJM-DML; dated Jun. 20, 2014; 4 pages, Document No. 1233.

GS Cleantech Corporation's Answer to Pacific Ethanol Stockton, LLC's Counterclaims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 25, 2014; 7 pages, Document No. 1236.

First Amended Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 25, 2014; 11 pages, Document No. 1237.

Defendants' Supplemental Reply Brief in Support of Summary Judgment of Invalidity for Indefiniteness Under 35 U.S.C § 112 ¶ 2 Pursuant to the Court's Order Requiring Breifing of Impact of *Nautilus, Inc.* V. *Biosig Instruments, Inc.*, 572 U.S. _ (Jun. 2, 2014), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 27, 2014; 10 pages, Document No. 1238.

Reply Memorandum of Law in Support of Defendant David Vander Griend's Motion to Dismiss for Lack of personal Jurisdiction, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 30, 2014; 9 pages, Document No. 1240.

Joint Motion to Amend the Scheduling Orders for Tag-Along Cases., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 7, 2014; 6 pages, Document No. 1243.

Aemetis, Inc., and Aemetis Advanced Fuels Keyes, Inc., Answer to First Amended Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 15, 2014; 14 pages, Document No. 1248.

Aemetis, Inc., and Aemetis Advanced Fuels Keyes, Inc., Answer to First Amended Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 16, 2014; 14 pages, Document No. 1249.

Plaintiff's Reply in Support of Its Motion to Amend the Complaint Against Guardian Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 17, 2014; 14 pages, Document No. 1251.

Plaintiff's Motion to Amend Its Complaint Against Southwest Iowa Renewable Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 3 pages, Document No. 1258.

Plaintiff's Memorandum of Law in Support of Its Motion to Amend Its Complaint Against Southwest Iowa Renewable Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 8 pages, Document No. 1259.

Plaintiff's Motion to Amend Its Complaint Against Little Sioux Corn Processors, LLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 3 pages, Document No. 1262.

Plaintiff's Memorandum of Law in Support of Its Motion to Amend Its Complaint Against Little Sioux Corn Processors, LLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 7 pages, Document No. 1263.

Plaintiff's Notice of Correction to Its Motions to Amend the Complaints Against Southwest Iowa Renewable Energy, LLC; Little Sioux Corn Processors, LLP; and Western New York Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 1, 2014; 3 pages, Document No. 1269.

Plaintiff's Memorandum of Law in Support of Its Motion to Amend Its Complaint Against Western New York Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 4, 2014; 8 pages, Document No. 1270.

Joint Opposition to Plaintiff's Motions to Amend the Complaint Against Southwest Iowa Renewable Energy, Western New York Energy, and Little Sioux Corn Processors, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 15, 2014; 7 pages, Document No. 1274.

Plaintiff's Reply in Support of Its Motion to Amend the Complaints Against Little Sioux Corn Processors, LLP; Southwest Iowa Renewable Energy, LLC; and Western New York Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 25, 2014; 9 pages, Document No. 1276.

GEA Mechanical Equipment US Inc's Reply Brief in Further Support of its Motion for Summary Judgment on the Issue of Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 16 pages, Document No. 1087.

GS Cleantech Corporation's Reply Brief in Support of its Motions for Summary Judgment of Infringement by '037 Plant Defendants and Memorandum in Support of Its Cross Motions for Summary Judgment of No Invalidity for Lack of Enablement Under 35 U.S. C. 112 OR 102(e), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 27 pages, Document No. 1160.

Pacific Ethanol Stockton LLC's Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Pacific Ethanol, Inc.'s Final Invalidity Contentions, filed in the United States District Court, Southern District of Indiana, Indianapolis, Division, in re: Method of Processing Ethanol Byproducts and

(56) References Cited

OTHER PUBLICATIONS

Related Subsystems ('858) Patent Litigation; Master Case. No. 1:10-ml-02181-LJM-DML; dated Aug. 22, 2014; 42 pages, including Certificate of Service.
GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 21 pages, including Certificate of Service.
GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 22 pages, including Certificate of Service.
GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 16 pages, including Certificate of Service.
GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 12 pages, including Certificate of Service.
GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 20 pages, including Certificate of Service.
Invalidity Contentions of Defendants for the Asserted Claims of the '858, '516, '517, and '484 Patents, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 7, 2014; 2 pages, including Certificate of Service.
Aemetis Advanced Fuels Keyes Inc.'s Preliminary Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 7, 2014; 22 pages, including Certificate of Service.
Aemetis Advanced Fuels Keyes, Inc. Claim Chart Obviousness/Anticipation 35 USC 103/102 '858, '516, '517, '484, '037, filed in the United States District Court, Southern District of Indiana, Indianapolis, Division, in re: Method of Processing Ethanol Byproducts and Related Subsystems ('858) Patent Litigation; Master Case. No. 1:10-ml-02181- LJM-DML; 18 pages.
Aemetis, Inc.'s Preliminary Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 7, 2014; 22 pages, including Certificate of Service.
Aemetis, Inc. Claim Chart Obviousness/Anticipation 35 USC 103/102 '858, '516, '517, '484, '037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 18 pages.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 14 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 7 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 12 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 11 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 10 pages, including Certificate of Service.
Adkins LLC's Motion for Summary Judgment on its Fourth Affirmative Defense of Unclean Hands Under FED. R. CIV . p. 56, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 925.
Defendants Aemetis, Inc., and Aemetis Advanced Fuels Keyes, Inc's Brief in Support of Motion for Suggestion for Remand filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case Nos. 1:13-CV-8014-LJM-DML; dated Sep. 19, 2013; 12 pages, Document No. 918; Certificate of Service, 4 pages (pp. 9-12).
Defendant Al-Corn Clean Fuel Motion for Summary Judgment of Non-Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 6 pages, Document No. 931.
Al-Corn Clean Fuel's Motion for Summary Judgment of Non-Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 933.
Defendants Aemetis, Inc., and Aemetis Advanced Fuels Keyes, Inc's Motion for Suggestion for Remand filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case Nos. 1:13-CV-8014-LJM-DML dated Sep. 19, 2013; 6 pages, Document No. 917; Certificate of Service, 3 pages (pp. 4-6).
GS Cleantech Corporation's Motion for Summary Judgment of Infringement of U.S. Patent No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 981.
Separate Opposition Brief of Cardinal Ethanol, LLC to Plaintiff GS Cleantech Corporation's Motion for Summary Judgment of Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 9 pages, Document No. 924.

(56) References Cited

OTHER PUBLICATIONS

Corrected Notice of Expert Report Service and Request for Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 16, 2013; 2 pages, Document No. 1060.

Declaration of Anthony C. Decinque, Esq. in Support of GEA Mechanical Equipment US Inc.'s Motion for Summary Judgment on the Issue of its Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 936.

Declaration of John M. Weyrauch in Support of Request for Reimbursement of Costs and Attorney's Fees, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 6 pages, Document No. 1004.

Defendant Flottweg Separation Technology, Inc.'s Document Production Status Report, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 9, 2013; 4 pages, Document No. 1056.

Defendant's Joint Motion for Summary Judgment of Invalidity and to Dismiss Plaintiff's Claim for Provisional Remedies and Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 5 pages, Document No. 940.

Designation of Evidence by Defendants in Support of Defendants' Motion for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 13 pages, Document No. 945.

Designation of Evidence in Support of Adkins's Motion for Summary Judgment on Unclean Hands, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 4 pages, Document No. 947.

GEA Mechanical Equipment US Inc.'s Brief in Support of its Motion for Summary Judgment on the Issue of Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 20 pages, Document No. 935.

Defendant GEA Mechanical Equipment US, Inc.'s Motion for Summary Judgment on the Issue of its Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 934.

GEA Mechanical Equipment US, Inc.'s Designation of Evidence in Support of its Motion for Summary Judgment on the Issue of its Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 20 pages, Document No. 937.

GS Cleantech Corporation's Answer to Aemetis, Inc. and Aemetis Advanced Fuels Keyes, Inc.'s Counterclaims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 4, 2013; 6 pages, Document No. 968.

Plaintiff's GS Cleantech Corporation Cross Motion for Summary Judgment of No Invalidity Under 35. U.S.C 112 Against Bushmills Ethanol, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1005.

Plaintiff's GS Cleantech Corporation Cross Motion for Summary Judgment of No Invalidity Under 35 U.S.C 112 Against Cardinal Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; date Nov. 22, 2013; 3 pages, Document No. 1009.

Plaintiff's GS Cleantech Corporation Cross Motion for Summary Judgment of No Invalidity Under 35 U.S.C 112 Against Big River Resources West Burlington, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; date Nov. 22, 2013; 3 pages, Document No. 1013.

Plaintiff's GS Cleantech Corporation Cross Motion for Summary Judgment of No Invalidity Under 35 U.S.C 112 Against Al-Corn Clean Fuel, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1019.

Plaintiff's GS Cleantech Corporation Cross Motion for Summary Judgment of No Invalidity Under 35 U.S.C 112 Against Big River Resources Galva, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1018.

Plaintiff's GS Cleantech Corporation Cross Motion for Summary Judgment of No Invalidity Under 35 U.S.C 112 Lincolnway Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1017.

Plaintiff's GS Cleantech Corporation Cross Motion for Summary Judgment of No Invalidity Under 35 U.S.C 112 Against Chippewa Valley Ethanol Company, LLLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1010.

Plaintiff's GS Cleantech Corporation Cross Motion for Summary Judgment of No Invalidity Under 35 U.S.C 112 Against Adkins Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1011.

Plaintiff's GS Cleantech Corporation Cross Motion for Summary Judgment of No Invalidity Under 35 U.S.C 112 Lincolnland Agri-Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1012.

Plaintiff GS Cleantech Corporation Cross Motion for Summary Judgment of No Invalidity Under 35 U.S.C 112 Against Blue Flint Ethanol, LLC, filed in the United States District Court, Southern District of Indiana, Indianapolis, Division, in re: Method of Processing Ethanol Byproducts and Related Subsystems ('858) Patent Liti-

(56) References Cited

OTHER PUBLICATIONS gation; Master Case. No. 1:10-ml-02181-LJM-DML; dated Nov. 22, 2013; 3 pages, Document No. 1014.
Plaintiff's GS Cleantech Corporation Cross Motion for Summary Judgment of No Invalidity Under 35 U.S.C 112 Against United Wisconsin Grain Producers, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1015.
Plaintiff's GS Cleantech Corporation Cross Motion for Summary Judgment of No Invalidity Under 35 U.S.C 112 Against Ace Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1016.
Plaintiff's GS Cleantech Corporation Cross Motion for Summary Judgment of No Invalidity Under 35 U.S.C 112 Against Flottweg Separation Technology Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1023.
GS Cleantech Corporation's Motion for Summary Judgment of Infringement of U.S. Patent No. 8,168.037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 983.
GS Cleantech Corporation's Motion for Summary Judgment of Infringement of U.S. Patent No. 8,168.037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 984.
GS Cleantech Corporation's Motion for Summary Judgment of Infringement of U.S. Patent No. 8,168.037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 982.
Iroquois Bio-Energy Company, LLC's Additional Opposition to G.S. Cleantech Corporation's Motion for Summary Judgment of Infringement by Plant Defendants and Iroquois' Additional Cross-Motion for Summary Judgment of Non-Infringement as to Certain patent Claims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 5 pages, Document No. 923.
Order Granting Joint Motion for Additional Pages in the United States District Court, Southern District of Indiana, Indianapolis, Division, in re: Method of Processing Ethanol Byproducts and Related Subsystems ('858) Patent Litigation; Case. No. 1:10-cv-0180-LJM-DML; dated Sep. 23, 2013; 4 pages, Document No. 921.
Lincolnway Energy LLC's Joinder Re Separate Opposition & Cross Motion by Iroquois Bio-Energy, LLC as to Claim 9 of the '516 Patent, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 930.
Memorandum of Law in Support of Defendants' Motion for Summary Judgment of Non-Infringement and in Opposition to Plaintiff's Motions for Summary Judgment of Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 56 pages, Document No. 951.
Stipulated Motion for Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 12, 2013; 4 pages, Document No. 1057.
Notice of Filing of Official Transcript, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 1 page, Document No. 1006.
Official Reporter's Transcript of Markman Hearing Regarding Patent No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 66 pages, Document No. 1007.
Order Granting Motion to Withdraw Appearance of R. Trevor Carter in the United States District Court, Southern District of Indiana, Indianapolis, Division, in re: Method of Processing Ethanol Byproducts and Related Subsystems ('858) Patent Litigation; Case. No. 1:10-cv-0180-LJM-DML; dated Dec. 27, 2010; 2 pages, Document No. 92.
Order Granting Defendants' Motion to File Two Separate Briefs and Plaintiff's Opposition in the United States District Court, Southern District of Indiana, Indianapolis, Division, in re: Method of Processing Ethanol Byproducts and Related Subsystems ('858) Patent Litigation; Case. No. 1:10-cv-0180-LJM-DML; dated Sep. 23, 2013; 6 pages, Document No. 922.
Reply Brief in Support of Defendants' Motion to Compel Proper and Complete Deposition Testimony of Peter Hagerty Re: U.S. Patent No. 8,168,037 Litigation, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 31, 2013; 11 pages, Document No. 995.
Redacted Order on Cross Motions for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 13, 2014, Document 1383; 233 pages.
Second Updated Corporate Disclosure Statement of Blue Flint Ethanol LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 7, 2014,Document 1378; 2 pages (including Certificate of Service).
Declaration of Randall J. Doyal in Response to Order to Show Cause as to Al-Corn Clean Fuel, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 5, 2014, Document 1376-2; 3 pages.
Declaration of Neal Kemmet in Response to Order to Show Cause as to Ace Ethanol, filed in the United States Distric Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 5, 2014, Document 1376-1; 3 pages.
Response to Order to Show Cause by Defendants Ace Ethanol, LLC and Al-Corn Clean Fuel, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 5, 2014, Document 1376; 3 pages (including Certificate of Service).
Exhibit 3, "Deposition of Andrew D. Dorisio, Esq.," filed in the United States District Court, Southern District of Indiana, Indianapolis, Division, in re: Method of Processing Ethanol Byproducts and

(56) References Cited

OTHER PUBLICATIONS

Related Subsystems ('858) Patent Litigation; Master Case. No. 1:10-ml-02181-LJM-DML; on Nov. 5, 2014, Document 1375-2; 9 pages.
Exhibit 2, "Letter for Chad A. Dever to Spiro Bereveskos dated Aug. 11, 2014," filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 5, 2014, Document 1375-1; 6 pages (including the King & Schickli Privilege Log).
Exhibit 1, "King Schickli Privilege Log," filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 5, 2014, Document 1375; 10 pages.
Motion to File Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 5, 2014, Document 1374; 3 pages (including Certificate of Service).
Pacific Ethanol Stockton, LLC's Withdrawal of Its Previously Filed Motion to Strike Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 3, 2014, Document 1371; 4 pages (including Certificate of Service).
Notice of Filing of Official Transcript, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 3, 2014, Document 1369; 1 page.
Exhibit ISO Motion to Compel Dever Rye (U.S. Patent 8,008,517 B2), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 30, 2014, Document 1368-2; 11 pages.
Exhibit ISO Motion to Compel Dever Rye (Information Disclosure Statement filed by Cantor Colbum LLP in U.S. Appl. No. 13/450,997, dated Oct. 29, 2014), filed in the United States District Court, Southern District of Indiana, Indianapolis, Division, in re: Method of Processing Ethanol Byproducts and Related Subsystems ('858) Patent Litigation; Master Case. No. 1:10-m1-02181-LJM-DML; on Oct. 30, 2014, Document 1368-3; 5 pages.
Exhibit 11, "ISO Motion to Compel Dever Rye (U.S. Patent 8,008,516 B2)," filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 30, 2014, Document 1368-1; 12 pages.
Exhibit ISO Motion to Compel Dever Rye (Information Disclosure Statement filed by Cantor Colburn LLP, in U.S. Appl. No. 13/450,997 dated Aug. 28, 2014), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 30, 2014, Document 1368; 6 pages.
Motion to File Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 30, 2014, Document 1367; 3 pages (including Certificate of Service).
GS Cleantech Corporation's Motion to Withdraw Its Motion to Compel the Production of Documents by Little Sioux Corn Processor LLLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 29, 2014, Document 1360; 2 pages (including Certificate of Service).
GS Cleantech Corporation's Opposition to Aemetis Advanced Fuel Keyes, Inc.'s Motion to Strike Plaintiff's Untimely Expert Report, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 27, 2014, Document 1356; 5 pages (including Certificate of Service).
Plaintiffs' Reply in Support of Its Motion to Compel the Production of Documents by Tag-Along Defendant Pacific Ethanol Stockton, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 27, 2014, Document 1355; 3 pages (including Certificate of Service).
Defendants ICM, Inc., et al., Motion to Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 22, 2014, Document 1349; 3 pages (including Certificate of Service).
GS Cleantech Corporation's Motion to Withdraw Its Compel the Production of Documents by ICM, Inc., and Tag-Along Defendant Pacific Ethanol Magic Valley, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 22, 2014, Document 1339; 3 pages (including Certificate of Service).
Request for Clarification of Court's Sealed Order Docket No. 1351, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 24, 2014, Document 1354; 3 pages (including Certificate of Service).
Plaintiffs' Motion to File Its Opposition to Iroquois Bio-Energy company LLC's., Motion to Compel Deposition of Chad Dever and Michael Rye and Exhibits Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 24, 2014, Document 1338; 2 pages (including Certificate of Service).
Tag-Along Defendant Pacific Ethanol Stockton, Inc.'s, Response to Plaintiff's Motion to Compel, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 17, 2014, Document 1335; 6 pages (including Certificate of Service).
Defendants ICM, Inc., et al., Motion to Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 17, 2014, Document 1334; 3 pages (including Certificate of Service).
Tag-Along Defendant Pacific Ethanol Stockton, Inc's Motion to Strike Plaintiff's Newly Asserted Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1332; 6 pages (including Certificate of Service).
Declaration of Michael J. Rye in Support of Motion to Compel the Amended and Corrected Interrogatory Responses and Production of Documents by Pacific Ethanol Stockton, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1330; 3 pages (including Certificate of Service).

(56) References Cited

OTHER PUBLICATIONS

Plaintiffs' Motion to File Its Memorandum in Support of the Motion to Compel the Amended and Correction of Interrogatory Responses and Production of Documents by Pacific Ethanol Stockton, Inc., and Certain Exhibits Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1331; 3 pages (including Certificate of Service).

[Redacted] Plaintiffs' memorandum in Support of the Motion to Compel the Amended and Correction of Interrogatory Responses and Production of Documents by Pacific Ethanol Stockton, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1329; 8 pages (including Certificate of Service).

Plaintiffs' Motion to Compel the Production of Documents by Tag-Along Defendant Pacific Ethanol Stockton, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1327; 3 pages (including Certificate of Service).

Declaration of Michael J. Rye in Support of Motion to Compel the Production of Documents by Pacific Ethanol Magic Valley, LLC and ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1326; 3 pages (including Certificate of Service).

Plaintiffs' Memorandum in Support of the Motion to Compel the Production of Documents by Pacific Ethanol Magic Valley, LLC and ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1325; 5 pages (including Certificate of Service).

Plaintiffs' Motion to Compel the Production of Documents by ICM, Inc., and Tag-Along Defendant Pacific Ethanol Magic Valley, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1324; 3 pages (including Certificate of Service).

Plaintiffs' Motion to File Certain Exhibits in Support of the Motion to Compel the Production of Documents by Little Sioux Corn Processor LLLP Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1323; 3 pages (including Certificate of Service).

Declaration of Michael J. Rye in Support of Motion to Compel the Amended and Corrected Interrogatory Responses by Little Sioux Corn Processors, LLLP., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1321; 3 pages (including Certificate of Service).

Plaintiffs' Memorandum in Support of the Motion to Compel the Amended and Corrected Interrogatory Responses by Little Sioux Corn Processors, LLLP., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1320; 5 pages (including Certificate of Service).

Plaintiffs' Motion to Compel the Production of Documents by Little Sioux Corn Processor LLLP., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 16, 2014, Document 1319; 3 pages (including Certificate of Service).

Defendant Aemetis Advanced Fuels Keyes, Inc.'s Motion to Seal Motion to Strike Plaintiff's Untimely Expert Report and Supporting Exhibits., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Oct. 14, 2014, Document 1318; 4 pages (including Certificate of Service).

GEA Mechanical Equipment US, Inc.'s Answer and Counterclaims to Plaintiff's Third Amended Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Mar. 29, 2012, Document 283; 31 pages (including Certificate of Service).

GS Cleantech Corporation's Motion to Submit a Surreply in Response to Iroquois Bio-Energy Company's Reply in Support of Its Motion to Compel Depositions of Chad Dever and Michael Rye, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 12, 2014, Document 1379; 3 pages (including Certificate of Service).

Plaintiff's Motion to File Its Surreply to Iroquois Bio-Energy Company LLC's Reply in Support of Its Motion to Compel Deposition of Chad Dever and Michael Rye, Declaration of Michael J. Rye, Esq. and Exhibits Under Seal, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Mar. 29, 2012, Document 1381; 3 pages (including Certificate of Service).

Order Discharging Order to Show Cause, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 13, 2014, Document 1382; 1 page.

Response in Opposition to GS Cleantech's Motion to File a Surreply to Iroquois Bio-Energy Company, LLC's Reply in Support of Its Motion to Compel Depositions of Chad Dever and Michael Rye, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 13, 2014, Document 1384; 4 pages (including Certificate of Service).

GS Cleantech's Reply to Defendants Response in Opposition to GS Cleantech's Motion to File a Surreply to Iroquois Bio-Energy Company, LLC's Reply in Support of Its Motion to Compel Deposition of Chade Dever and Michael Rye, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 14, 2014, Document 1385; 4 pages (including Certificate of Service).

\* cited by examiner

METHOD AND SYSTEMS FOR ENHANCING OIL RECOVERY FROM ETHANOL PRODUCTION BYPRODUCTS

This application is a continuation of U.S. patent application Ser. No. 11/856,150 filed on Sep. 17, 2007 now U.S. Pat. No. 8,168,037 and Ser. No. 11/908,891 filed on Sep. 17, 2007, which claims the benefit of PCT Application PCT/US2006/09238, filed on Mar. 15, 2006, which claims the benefit of U.S. Provisional Patent Application Ser. No. 60/661,733, filed Mar. 15, 2005, the disclosures of which are incorporated herein by reference.

COPYRIGHT STATEMENT

A portion of the disclosure of this document contains material subject to copyright protection. No objection is made to the facsimile reproduction of the patent document or this disclosure as it appears in the Patent and Trademark Office files or records, but any and all rights in the copyright(s) are otherwise reserved.

TECHNICAL FIELD

The present invention relates generally to producing oil from corn and, more particularly, to recovering oil from a byproduct of the dry milling process used to obtain ethanol from corn.

BACKGROUND OF THE INVENTION

Over the past thirty years, significant attention has been given to the production of ethyl alcohol, or "ethanol," for use as an alternative fuel. Ethanol not only burns cleaner than fossil fuels, but also can be produced using corn, a renewable resource. At present, an estimated sixty-nine "dry milling" plants in the United States produce over three billion gallons of ethanol per year. Additional plants presently under construction are expected to add billions of gallons to this total in an effort to meet the current high demand.

As noted in the foregoing discussion, a popular method of producing ethanol from corn is known as "dry milling." As is well known in the industry, the dry milling process utilizes the starch in the corn to produce the ethanol through fermentation, and creates a waste stream or byproduct termed "whole stillage" (which may be further separated into byproducts commonly referred to as "distillers wet grains" and "thin stillage"). Despite containing valuable oil, these byproducts have for the most part been treated as waste and used primarily to supplement animal feed. This feed is mostly distributed in the form of distillers dried grains with solubles, which is created by evaporating the thin stillage, recombining the resulting concentrate or syrup with the distillers wet grains, and drying the product to a moisture content of less than about 10% by weight.

Significant attention has recently been given to the use of oil, including corn oil, as an alternative fuel. This fuel oil, frequently termed "biodiesel", is a cleaner fuel than petroleum-based diesel (less emissions), environmentally safe (spills biodegrade quickly), and can be mixed at any concentration to diesel without engine modification. The current value of corn oil as biodiesel is approximately $2.40 per gallon, or $648/ton, which is essentially double the value of the commercial feed that would normally include this oil. Although the market for the biodiesel is growing rapidly and the potential profit is significant, key limiting factors are the cost of obtaining the oil using current techniques and the resulting quality.

In this regard, efforts to recover usable oil from the byproducts of the dry milling process used to create ethanol have not been terribly successful in terms of efficiency. One proposed approach involves attempting to separate the oil from the thin stillage before the evaporation stage, such as using a centrifuge. However, spinning the thin stillage at this stage using a centrifuge creates an emulsion phase that typically requires further processing before useable oil can be recovered. Moreover, the volume of thin stillage is generally 2 to 10 times greater than the syrup, which is a considerable capital requirement to purchase the number of centrifuges required. Known techniques also lack the capability to maximize the oil recovery, which leads to decreased efficiency and concomitant lower profits. Together, these obstacles make past and current attempts to recover oil from ethanol production byproducts, such as corn thin stillage, somewhat inefficient and uneconomical.

U.S. Pat. No. 5,250,182 (the disclosure of which is incorporated herein by reference) describes the use of filters for removing substantially all solids and recovering lactic acid and glycerol from the thin stillage without the need for evaporation. Despite eliminating a step in the conventional process, the proposal results in a more complicated arrangement requiring multiple filtration steps. Wholesale elimination of the evaporator in the vast majority of existing plants is also unlikely and otherwise uneconomical. Filters, and especially the microfiltration and ultrafiltration types proposed for use in this patent, are also susceptible to frequent plugging and thus deleteriously increase the operating cost. For these reasons, the filtration process proposed in this patent has not gained widespread commercial acceptance.

Accordingly, a need exists for more efficient and economical manners of recovering oil from byproducts created during the dry milling of corn to produce ethanol.

SUMMARY OF THE INVENTION

In accordance with one aspect of the invention, a method of processing concentrated thin stillage created during a dry milling process used for producing ethanol from corn is disclosed. The method comprises recovering oil from the concentrated thin stillage and further evaporating the concentrated thin stillage. The recovered oil may be used, for example, as biodiesel, and the leftover concentrated thin stillage dried and used as feed.

In one embodiment, the recovering step comprises separating the oil from the concentrate using a disk stack centrifuge. The disk stack centrifuge produces suspended solids, which may be mixed with distillers wet grains. The disk stack centrifuge also produces a syrup, and the method may further comprise mixing the syrup, the suspended solids and distillers wet grains to form a mixture. The method may further include the step of drying the mixture.

In accordance with another aspect of the invention, a method of processing thin stillage created by a dry milling process used for producing ethanol from corn to recover oil is disclosed. The method comprises evaporating the thin stillage to form a concentrate. At some point in time during the evaporating step, but before it is completed, the method also includes the step of introducing the concentrate to a disk stack centrifuge. The disk stage centrifuge then recovers oil from the concentrate.

The method may further include the step of evaporating the concentrate after the step of using the disk stage centrifuge to recover oil. Preferably, the evaporating step comprises using a multi-stage evaporator to form the concentrate from the thin stillage and the step of introducing the concentrate to a disk stack centrifuge is completed before the last stage of the evaporator. The evaporator most preferably includes at least one scraped surface heat exchanger.

In accordance with still another aspect of the invention, a method of recovering oil from thin stillage created by a dry milling process used for producing ethanol from corn is disclosed. The method comprises using a multi-stage evaporator to form a concentrate from the thin stillage. Before the last stage of the evaporator, the method includes recovering oil from the concentrate. In one embodiment, the method of this aspect of the invention further includes the step of further evaporating the concentrate remaining after the recovering step.

In accordance with a further aspect of the invention, a method of processing whole stillage resulting from the dry milling of corn to form ethanol is disclosed. The method comprises recovering thin stillage including solids from the whole stillage; concentrating the thin stillage including the solids; and recovering oil from the thin stillage before the concentrating step is complete.

In accordance with yet another aspect of the invention, a subsystem for intended use in a system for producing ethanol by dry milling corn and creating thin stillage as a byproduct is disclosed. The system comprises a multi-stage evaporator for evaporating the thin stillage, as well as means for receiving thin stillage before the last stage of the evaporator and recovering oil therefrom.

In one embodiment, the multi-stage evaporator includes two distinct evaporators. These evaporators are separated by a disk stack centrifuge serving as the receiving and recovering means. Most preferably, the evaporator includes at least one scraped surface heat exchanger.

In accordance with another aspect of the invention, a method of processing a byproduct of a dry milling process used for producing ethanol from corn is disclosed. The method comprises washing the byproduct to create wash water including oil, concentrating the wash water; and recovering oil from the concentrated wash water.

In one embodiment, the byproduct is whole stillage and the washing step comprises delivering the whole stillage to a first decanter for producing thin stillage and distillers wet grains. In such case, the method may further include the step of washing the distillers wet grains. In particular, the step of washing the distillers wet grains may comprise delivering the distillers wet grains to a second decanter for producing washed wet grains and the wash water used in the concentrating step. The thin stillage may be combined with the wash water before the concentrating step.

In accordance with still a further aspect of the invention, a system for processing whole stillage produced from dry milling corn is disclosed. The system comprises a first separator for receiving the whole stillage and creating at least thin stillage and distillers wet grains. A second separator receives the distillers wet grains and wash water for creating washed wet grains and an oil-bearing discharge (e.g., wash water or an oil phase). Means for recovering oil from the oil-bearing discharge is also provided.

In one embodiment, the first separator is a two phase decanter for producing wash water delivered to the second separator. Preferably, the second separator is a two phase decanter, but may instead be a three phase decanter. An evaporator may be provided for receiving the thin stillage and wash water to form a concentrate, along with a third separator for recovering oil from the concentrate. The system may further include a dryer for drying a combination of the washed wet grains and any concentrate remaining after recovering oil using the third separator. The evaporator may be a multi-stage evaporator and the third separator comprises a disk-stack centrifuge that receives the concentrate before the last stage of the evaporator.

In accordance with still another aspect of the invention, a system for processing thin stillage and distillers wet grains produced from dry milling corn is disclosed. The system comprises a first separator for receiving the distillers wet grains and creating at least washed wet grains and wash water. An evaporator evaporates the thin stillage and wash water to form a concentrate. A second separator recovers oil from the concentrate.

Preferably, the first separator is a second decanter downstream of a first decanter for forming the distillers wet grains and thin stillage. Either the first or second decanter may be a two phase decanter, or a three phase decanter. The second separator preferably comprises a disk-stack centrifuge.

In accordance with yet a further aspect of the invention, a system for processing whole stillage produced from dry milling corn is disclosed. The system comprises means for receiving the whole stillage and creating at least thin stillage, means for concentrating the thin stillage, and means for recovering oil from the concentrated thin stillage.

In one embodiment, the means for receiving the whole stillage is a two phase decanter. In another, the means for receiving the whole stillage is a three phase decanter. In still another, the means for receiving the whole stillage includes a two phase decanter followed by a three phase decanter, or vice versa. Yet another option is for the means for receiving the whole stillage to include a three phase decanter followed by a three phase decanter. Preferably, the means for concentrating is a multi-stage evaporator, and the recovering means is a disk-stack centrifuge. However, the means or device for recovering may comprise any suitable device for separating oil from a mixture, such as a gravity separator, a centrifuge, a centrifugal decanter, or an evaporator. Means for recovering oil using known techniques of chemical addition (pH adjustment, enzymatic action, etc.) may also be effective.

In accordance with one more aspect of the invention, a method for processing whole stillage including oil produced from dry milling corn includes the steps of: (1) washing the whole stillage to create oil-laden wash water; and (2) recovering oil from the wash water. The washing step may further include separating the whole stillage into at least thin stillage and distillers wet grains, as well as possibly oil. The method may further include the step of concentrating the thin stillage and recovering oil from the concentrated thin stillage. Still further, the method may include the step of combining the wash water with the thin stillage before the concentrating step.

BRIEF DESCRIPTION OF THE DRAWING FIGURES

DETAILED DESCRIPTION OF THE INVENTION

One aspect of the invention relates to a method of recovering oil from a byproduct resulting from the production of ethanol from corn using a dry milling technique, as extensively described in co-pending U.S. patent application Ser. No. 11/122,859, the disclosure of which is incorporated herein by reference. Summarizing that method, one byproduct of the dry milling process, known as "thin stillage," is recovered by separating the distillers wet grain from the "whole stillage" leftover after fermentation is complete. As is known in the art and discussed below in further detail, this mechanical separation may be accomplished using a press/extruder, a decanter centrifuge (also simply known as a "decanter"), or a screen centrifuge. Moisture is then removed from the unfiltered thin stillage to create a concentrate or syrup, such as through evaporation. Usable oil is then easily recovered from this concentrate through mechanical processing, without the prior need for multiple stages of filtration or other expensive and complicated forms of processing.

In one embodiment of this proposed method, oil is recovered from the concentrate by passing it through a centrifuge and, in particular, a disk stack centrifuge (and, most preferably, a self-cleaning bowl type). Preferably, the concentrate delivered to the disk stack centrifuge is at a temperature of between about 150 and 212° F. (and ideally 180° F.), a pH of between about 3 and 6 (ideally between about 3.5 and 4.5) and, as a result of the preceding evaporation step, has a moisture content of less than about 90% (ideally about 60-85%). Under these process conditions, the disk stack centrifuge is able to separate the oil in usable form from the concentrate in an efficient and effective manner, despite the relatively high level of solids present (which may be recovered from the centrifuge in a continuous or intermittent fashion, depending on the particular process conditions).

Besides creating usable oil, the concentrate or syrup recovered from the disk stack centrifuge is considered more valuable. This is because the post-evaporation processing to remove the oil improves the efficiency of the drying process used on the combined concentrate syrup and distillers wet grains. A stable, flowable product for supplementing animal feed results, which thus further complements the value of the oil recovered.

To illustrate the potential benefits that may be obtained by using the above-described technique, the following examples are presented.

Example 1

Figure 1:
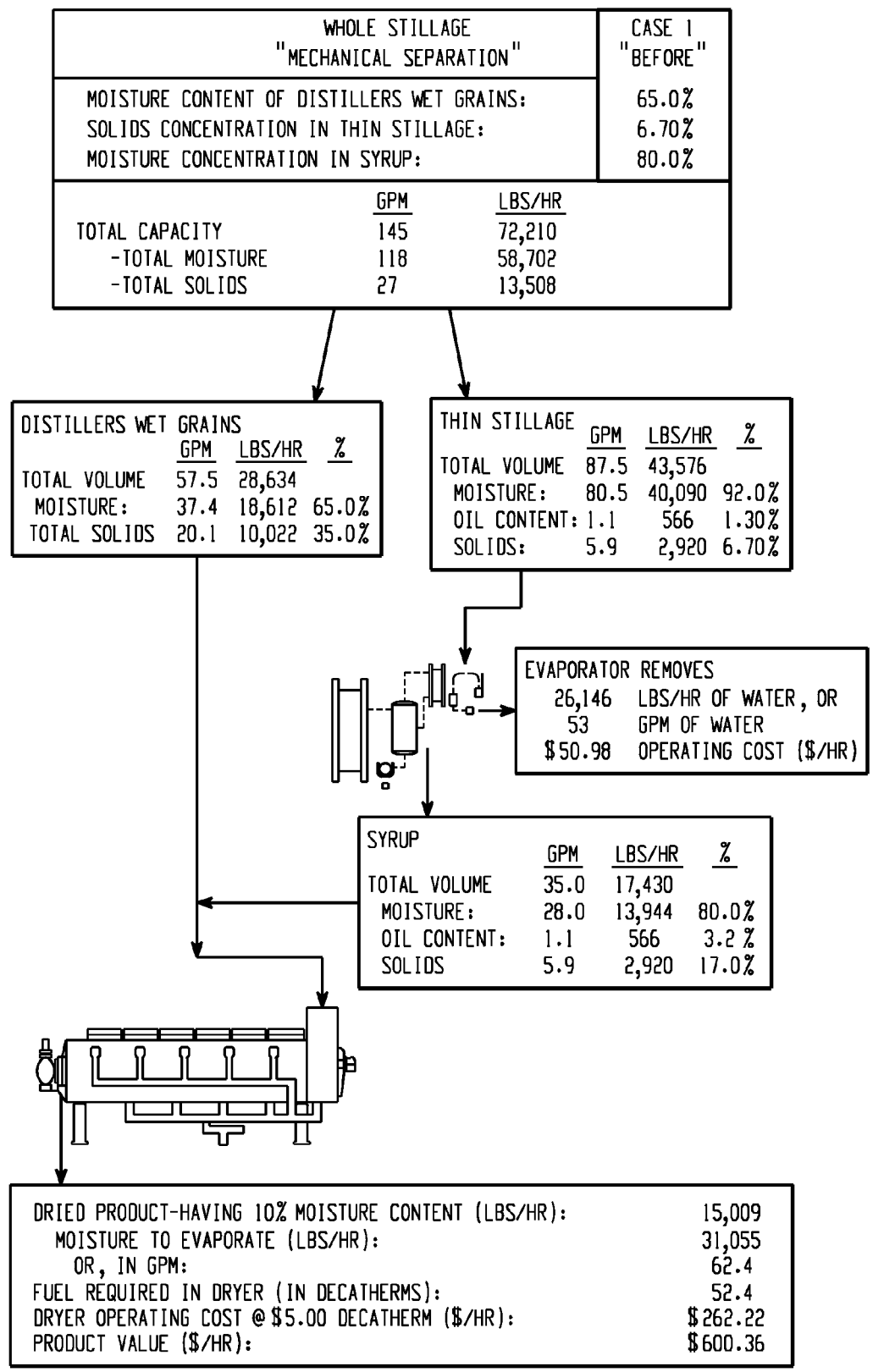
FIG. 1 is a partially schematic flow chart illustrating the processing of co-products formed during the ethanol extraction process.
Figure 2:
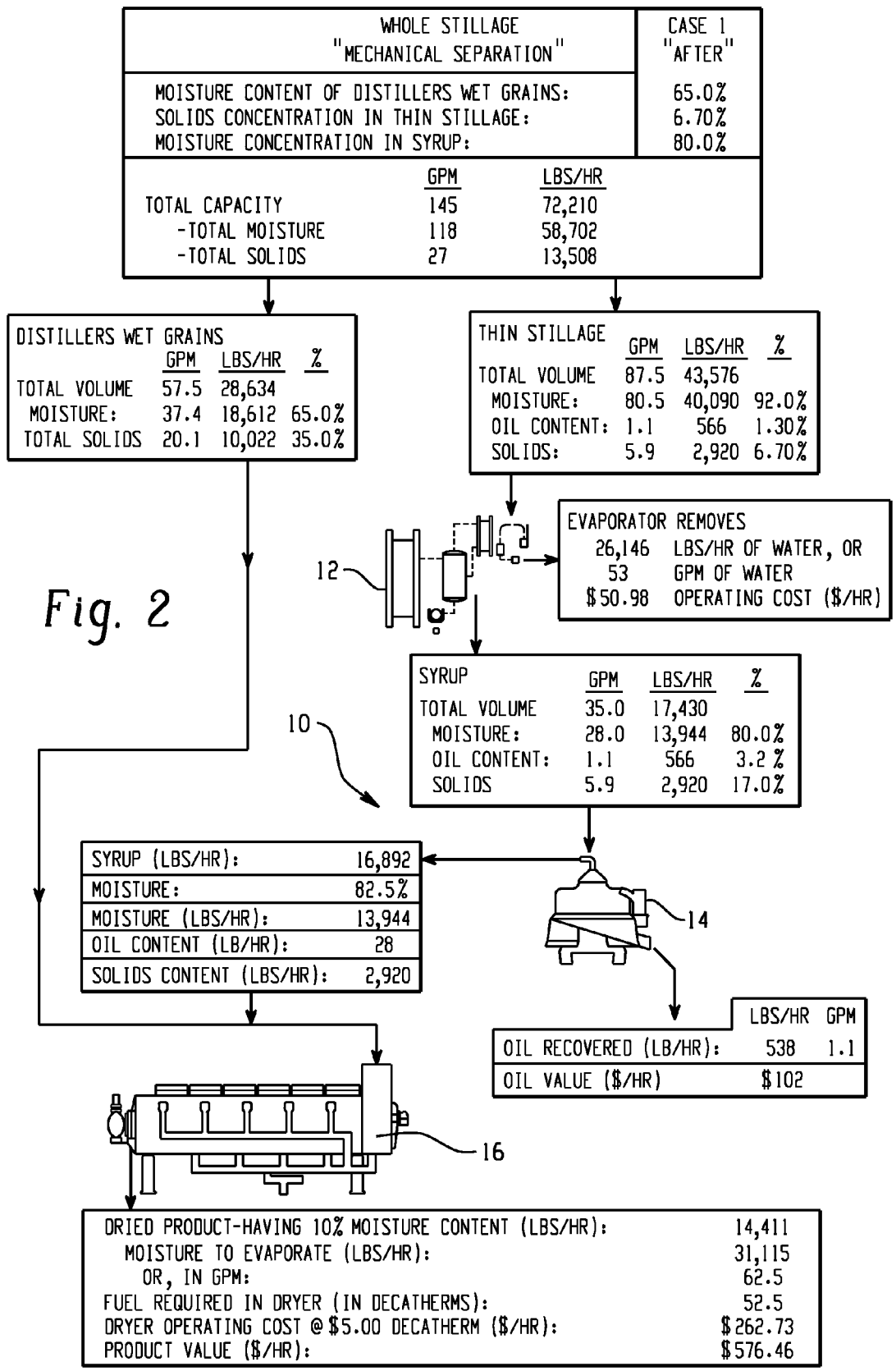
FIG. 2 is a partially schematic flow chart illustrating the recovery of oil from a syrup formed by evaporating the thin stillage.

Reference is made to FIGS. 1 and 2 to illustrate schematically a first example demonstrating the possible efficacy of the present method. FIG. 1 represents one technique for processing whole stillage to create distillers dried grains with solubles. The whole stillage leftover after deriving the ethanol would be mechanically separated into distillers wet grains (approx. 35% solids) and thin stillage (approx. 8% solids) using a centrifugal decanter. The resulting thin stillage is then introduced to an evaporator to create a concentrate, or syrup, having a moisture content of approximately 80% and about 17% solids. This syrup is then recombined with the distillers wet grains, introduced to a drum dryer, and dried to reduce the overall moisture content to approximately 10%. At present, an estimated total value of the resulting distillers dried grains with solubles is $600.36 per hour.

FIG. 2 represents the inventive method and a related subsystem 10 for implementing it. Initial processing of the whole stillage is done in the same fashion, and the mechanically separated thin stillage is delivered to the evaporator 12 forming part of the subsystem 10. The resulting concentrate or syrup having a moisture content of approximately 80% and a solids content of approximately 17% is delivered to a disk stack centrifuge 14, such as an Alfa Laval Model No. 510, 513, or 617 or equivalent device. At an infeed rate of approximately 35 gallons per minute, this centrifuge 14 recovers usable oil at a rate of 538 pounds per hour and produces syrup having a having a moisture content of 82.5%, but with far less oil in view of the preceding recovery step.

Recombining the syrup (which is substantially free of oil) from the centrifuge 14 with the distillers wet grains and drying in a drum dryer to a moisture content of 10% results in a product having a value of $576.46 per hour. However, the 538 pounds per hour of oil recovered has a product value of approximately $102 per hour. Accordingly, the total product value using the inventive method is $678.46 per hour, which is approximately 12% greater than the $600.36 per hour product value resulting from use of the conventional set-up shown in FIG. 1. Moreover, removal of the majority of the oil before the drying step makes the process more efficient, and results in an estimated energy savings of approximately 10%, or $26.27 per hour. As a result, product value per hour ($678.46) less the estimated dryer operating cost ($236.46 per hour with the 10% savings) and less the estimated evaporator operating cost ($50.98 per hour) is about $391.02 per hour.

Example 2

Figure 3:
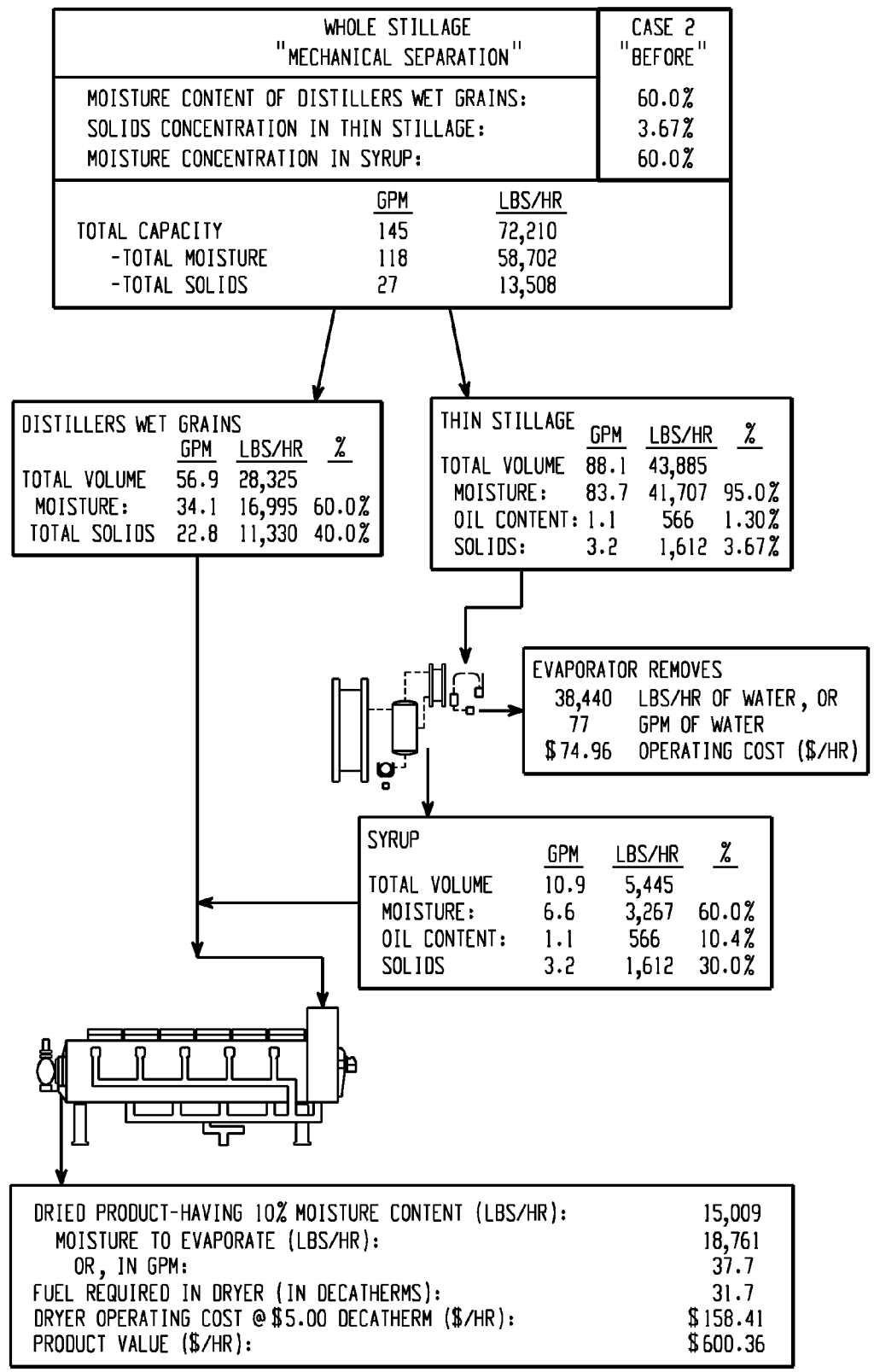
FIG. 3 is a schematic view similar to FIG. 1.
Figure 4:
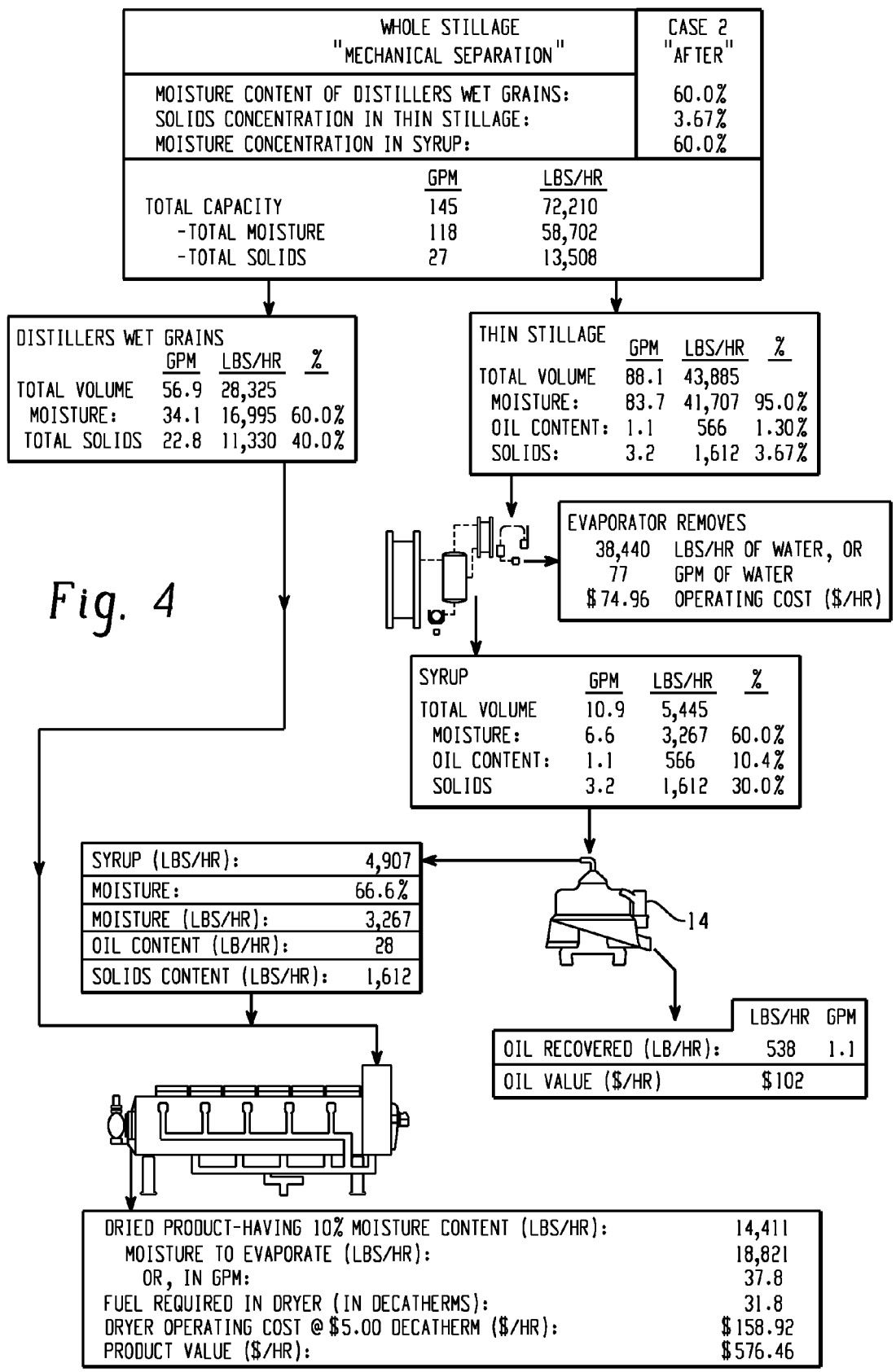
FIG. 4 is a schematic view similar to FIG. 2.

Reference is made to FIGS. 3 and 4, which illustrate a prophetic comparison between one processing method and the inventive method. The set-up is essentially the same as shown in FIGS. 1 and 2, but a more effective centrifugal decanter is used than the one used in Example 1. As a result, the syrup introduced to the disk stack centrifuge would have a moisture content estimated at 60%. While this does not impact the product value figures, the syrup delivered from the disk stack centrifuge 14 has a moisture content of only 66.6%, as compared to 82.5% in Example 1. As a result, the cost per hour of drying this syrup when combined with the distillers wet grains to achieve an end product having a moisture content of less than 10% is only $158.92, or approximately 40% less. Assuming a savings in dryer efficiency of 10%, the product value per hour ($678.46) less the estimated dryer operating cost ($143.03 per hour) and less the estimated evaporator operating cost ($74.96 per hour) is $460.46 per hour. This represents an approximate 15% increase over the corresponding value calculated for Example 1.

As should be appreciated, the above-described method and subsystem essentially require the addition of a disk stack centrifuge downstream of the evaporator in the conventional system for processing corn thin stillage. Accordingly, instructions on how to implement the above-described method (including the optimum process variables) may be provided along with a disk stack centrifuge when sold to a ethanol plant for forming the novel subsystem 10 disclosed herein. Such instructions result in the most efficient implementation of the method, as compared to the situation where the scientists or engineers at the plant must experiment with the disk stack centrifuge to determine the optimum process conditions required to achieve a favorable result.

Figure 5:
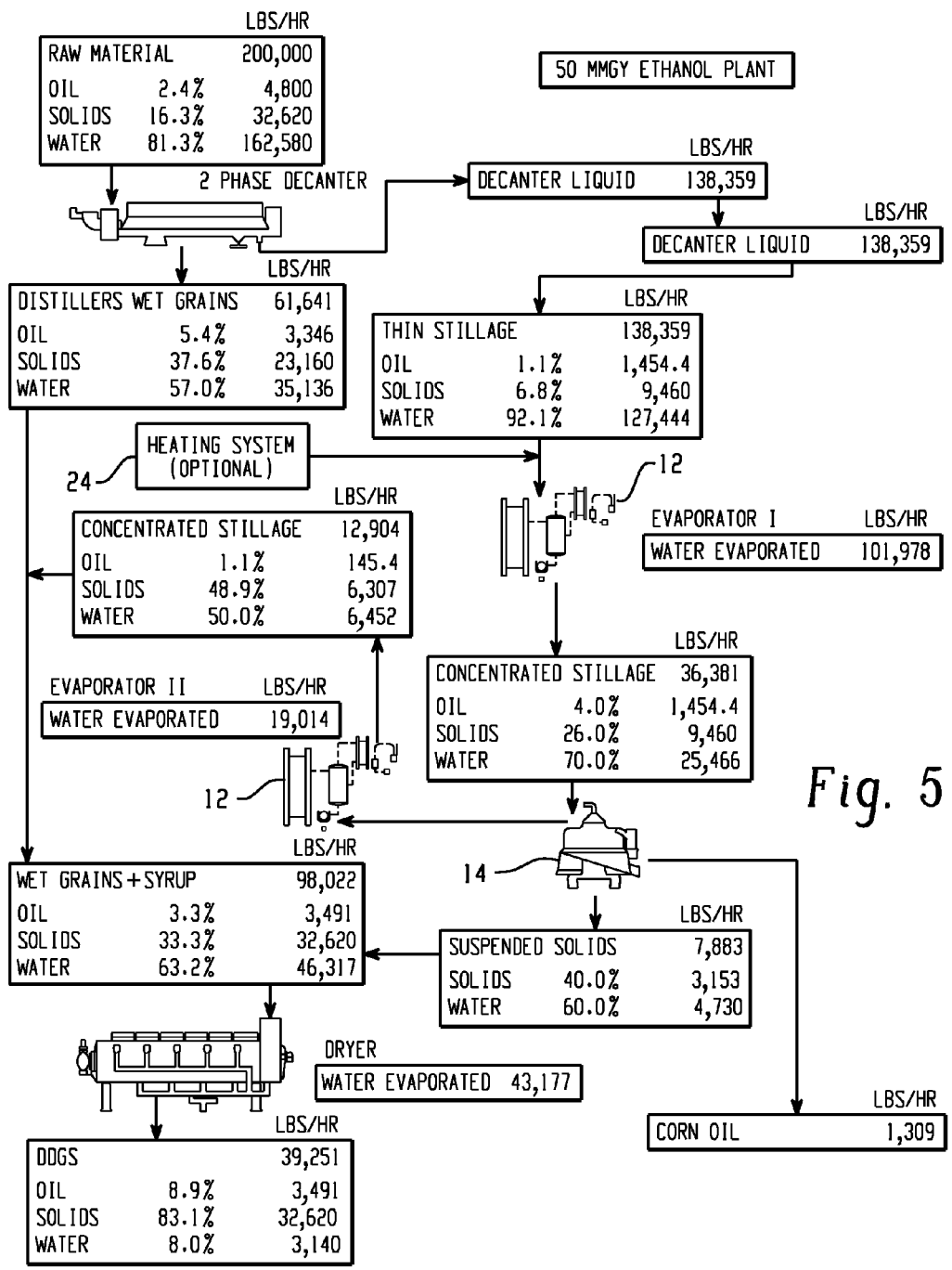
FIG. 5 is a schematic flow chart illustrating the strategic positioning of a separator relative to the evaporation of thin stillage.

In accordance with one aspect of the invention, another method of recovering oil from the thin stillage is disclosed. As shown in FIG. 5, this embodiment is similar to the one described above in that the thin stillage is passed through a separator (centrifuge 14 and, in particular, a disk stack centrifuge (such as, for example, an Alfa Laval AFPX 513 or AFPX 617)) to recover valuable corn oil. The process conditions used may be similar or identical to those already described.

Besides creating corn oil, the disk stack centrifuge 14 also produces byproducts, including suspended solids (or "sludge") and syrup (which were collectively referred to above as "syrup" or concentrated stillage for purposes of convenience). This syrup byproduct may be further concentrated, such as by using an evaporator, to thus minimize the amount of moisture in it (in the example, to about 50%). The resulting concentrated stillage may then be delivered to the dryer along with the distillers wet grains and suspended solids obtained from the separator, such as centrifuge 14. Since an evaporator 12 is generally considered more efficient than a drum dryer, the overall efficiency of the process improves as a result (possibly as much as 25%, depending on the performance of the centrifuge 14 and the evaporator 12).

A related aspect of the invention involves the strategic positioning of the separator for recovering oil from the concentrated stillage relative to the means for concentrating the thin stillage, which may comprise an evaporator 12 including multiple stages. In particular, a typical multi-stage evaporator 12 used in an ethanol plant includes eight (8) successive stages, with each stage further concentrating the syrup by removing moisture. Installing the separator (centrifuge 14) prior to the last stage (e.g., at the seventh stage or earlier) may further enhance the efficiency of the process (which is considered an ancillary benefit, since the primary benefit of achieving oil recovery is accomplished regardless of this aspect). The remaining concentrate (syrup) may then be further concentrated, such as using the remaining stages of the evaporator or a different evaporator.

Primarily, this strategic positioning is beneficial because the separator (centrifuge 14) removes suspended solids, which are most responsible for fouling the corresponding heat exchangers of the evaporator 12. A side benefit is that the centrifuge 14 serving as the exemplary separator may be better able to extract the corn oil from the thin stillage at the lesser solids concentrations associated with the earlier stages of the evaporation process. Adding the separator, such as centrifuge 14, before the last stage also maximizes evaporator usage, which can result in a significant reduction in energy costs (perhaps as much as $500,000 annually for a 50 mmgy ethanol plant).

In practice, the evaporators 12 in many ethanol plants are already "at capacity." In such cases, it may be necessary to add evaporator capacity to maximize the benefit of removing the suspended solids using the separator, such as centrifuge 14 (which, again, is a benefit in addition to that afforded by the recovery of valuable oil from a previously less-valuable byproduct: thin stillage). This can be accomplished by: (1) increasing the size of the final stage(s) of the evaporator; (2) adding additional stages; or (3) adding a separate, "stand alone" evaporator (which may include shell and tube, plate and frame, or scraped surface heat exchangers).

Yet a further aspect of the invention is another process and system for recovering oil from corn byproducts, various embodiments of which are now described with reference to FIGS. 6-11. In this aspect of the invention, the leftover whole stillage is "washed" prior to undergoing further processing. As is known in the art, "Washing" animal protein products typically involves heating to liberate the oil contained therein, mixing in water, and then recovering the oil-laden liquid (termed "wash water"), which may then undergo further separation. The remaining "wet" defatted protein solids are then used in food products for animal consumption (including humans).

Figure 6:
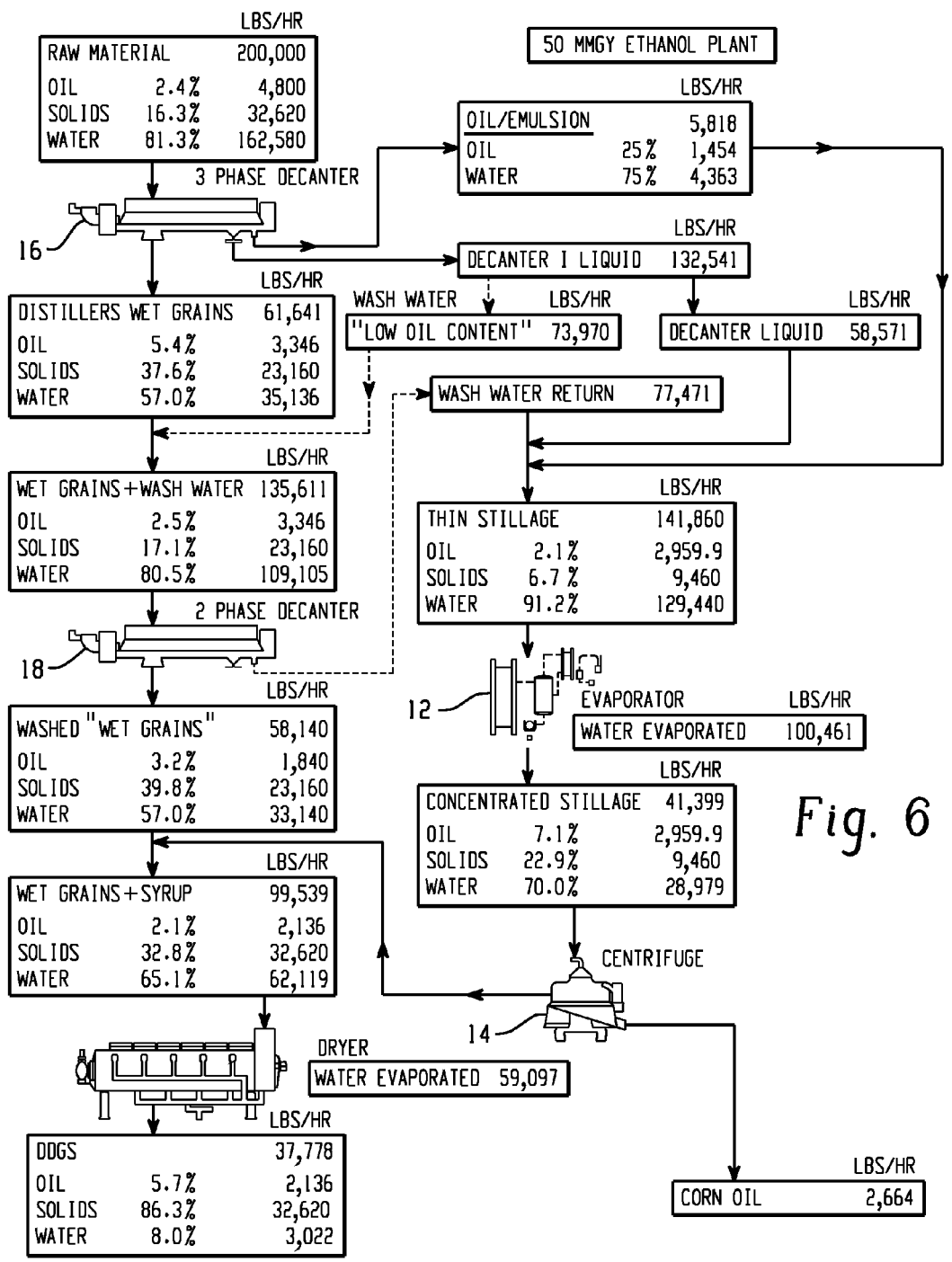
FIG. 6 is a schematic flow chart illustrating one technique and system for washing whole stillage to maximize oil recovery.

In one embodiment, this "washing" process as applied to a byproduct from the dry milling of corn to produce ethanol involves first using a mechanical separator to split the raw material serving as the byproduct (whole stillage), such as a centrifugal decanter (2 phase (e.g., Alfa Laval Model NX 934 DD) or three phase), press extruder, rotary screen, or the like. In FIG. 6, this mechanical separator is illustrated as a three phase decanter 16 for splitting the raw material into three phases: a solids (heavy) phase, a water (intermediate) phase, and an oil (light) phase (typically in the form of an emulsion). Depending on the relative content, the oil phase and the intermediate phase together may be recovered for use, as discussed below, or evaporated and passed through another separator, such as a centrifuge 14, to recover valuable oil, on the one hand, and distillers wet grains and syrup on the other.

Figure 7:
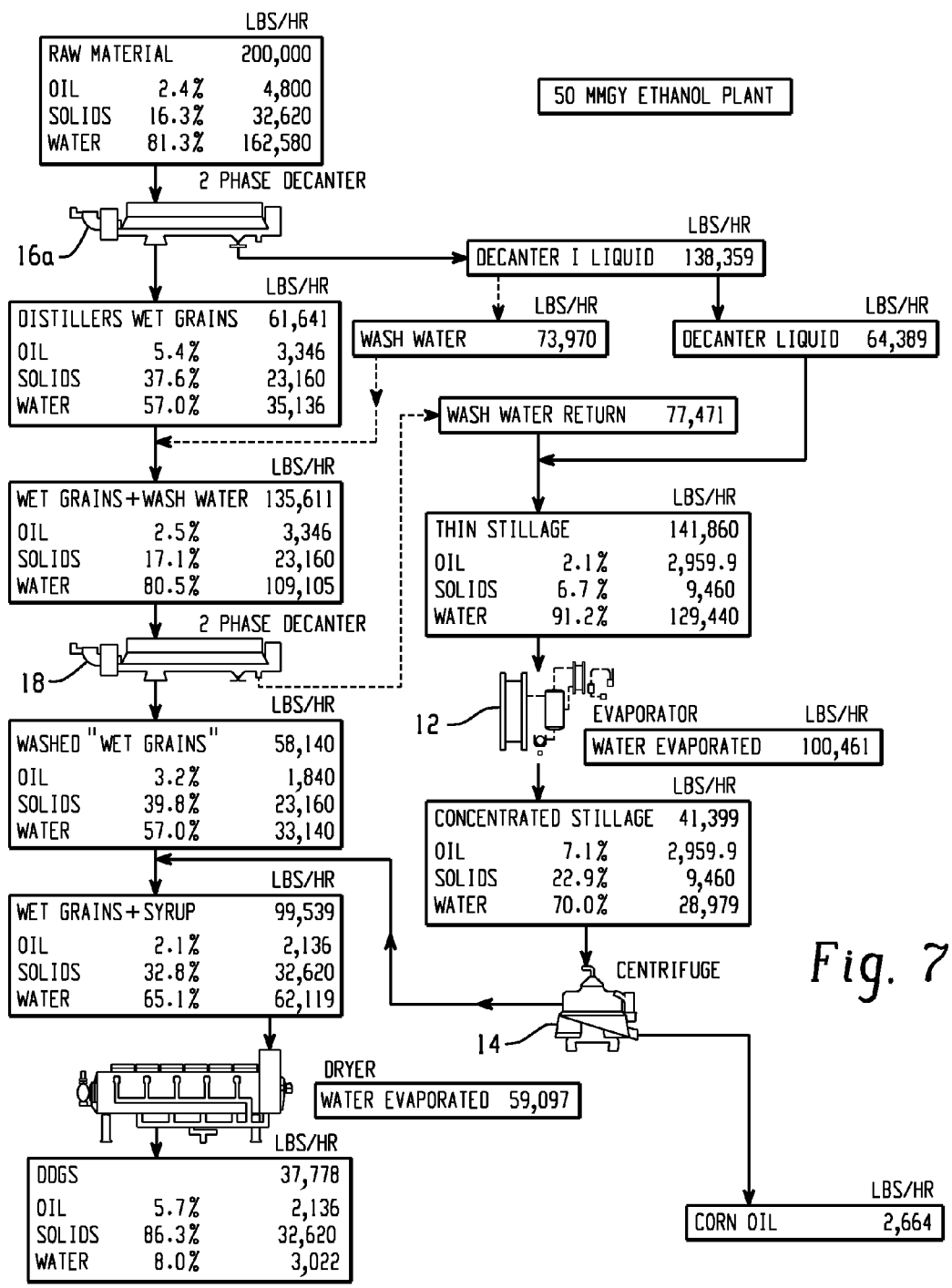
FIG. 7 is a schematic flow chart illustrating another technique and system for washing whole stillage to maximize oil recovery.
Figure 8:
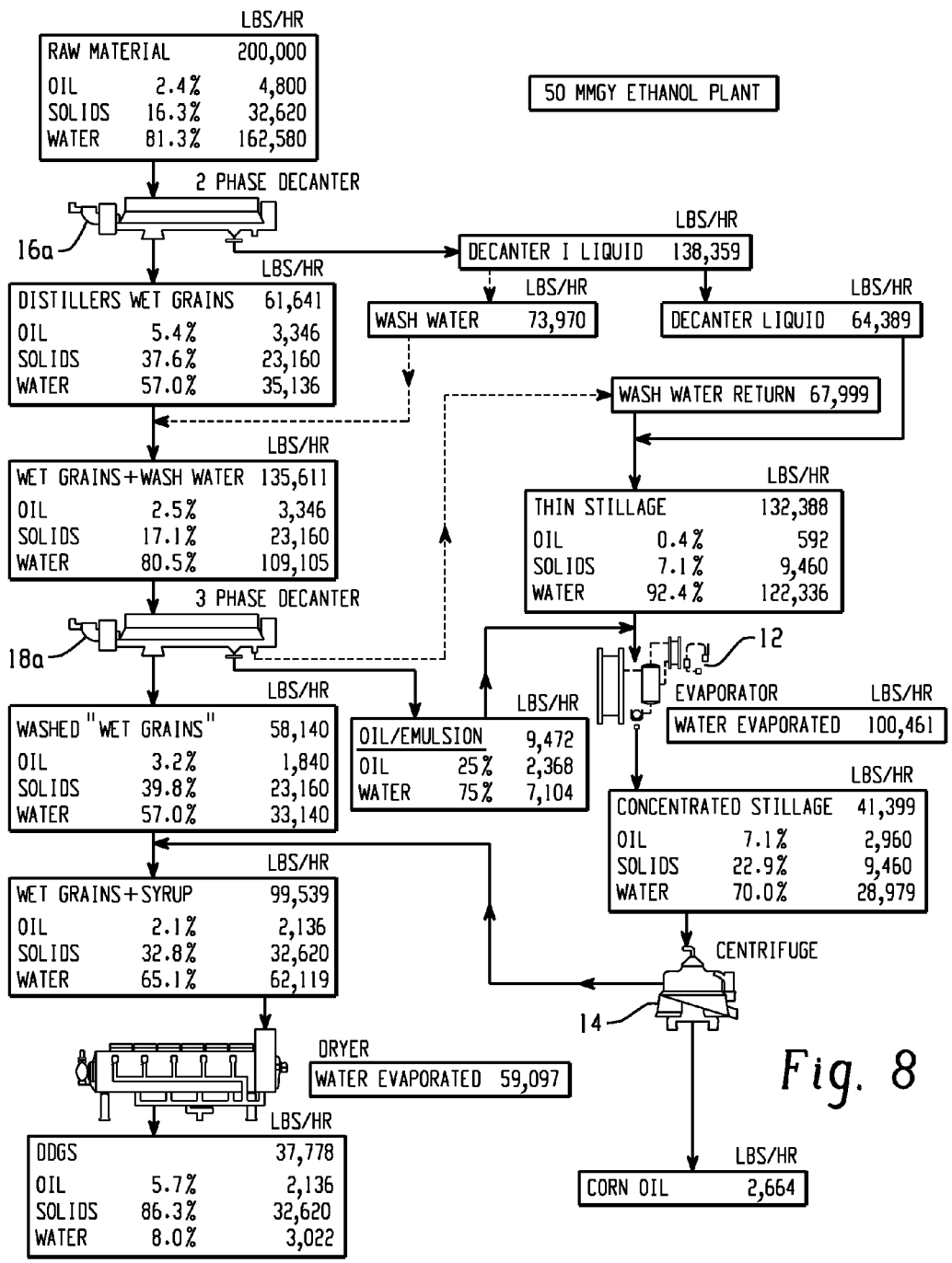
FIG. 8 is a schematic flow chart illustrating yet another technique and system for washing whole stillage to maximize oil recovery.

In accordance with another aspect of the invention, a portion of the liquid phase from this first mechanical separator (e.g., decanter 16) used for washing can be used as wash water in a second separator for performing further washing of the resulting byproduct. If using a three phase decanter 16 as the first separator, as described in FIG. 6, this wash water will have a lower oil content than typical thin stillage and thus may allow from higher oil removal during washing. If using a two phase decanter (as shown in FIGS. 7 and 8 and described below), a portion of the decanter liquid (thin stillage) can also be used as wash water. However, the wash water can be any liquid, including but not limited to thin stillage, defatted thin stillage, or water (well, potable, condensate, etc.).

The oil content is very low in thin stillage and de-fatting it as is done in animal processing prior to washing is not necessary. For example, in animal processing, the decanter liquid has an oil content of 20% to 50% and thus cannot be used as wash water without first de-fatting it in a centrifuge (or other oil removal technique). Preferably, the wash water is at or below 1.5% oil content. As seen in FIG. 5, the thin stillage from ethanol is at 1.1% oil content and suitable for wash water without any oil removal (see also FIGS. 7 and 8, where two phase decanters are used).

In any case, this wash water may be recombined with the distillers wet grains (which still contain roughly two-thirds of the oil present in the whole stillage). In the illustrated embodiment of FIG. 6, the wash water and wet grains are then together fed to a downstream second mechanical separator, such as the two phase decanter 18. The output is "washed" distillers wet grains and wash water. The oil-laden wash "water" from the second separator (e.g., decanter 18) may then be recombined with the decanter liquid, as well as possibly with the oil phase recovered from the first separator, such as the three phase decanter 16. Together, this combination forms the thin stillage, which as described above may be concentrated and separated into syrup, suspended solids, and usable oil by a third separator, such as the illustrated centrifuge 14.

As an adjunct to this aspect of the invention, the "leftover" syrup obtained from the centrifuge 14 may be further evaporated, as described above, combined with the "washed" wet grains, and then dried. For the exemplary 200,000 lbs/hour input proposed in the arrangement shown in FIG. 6, the result may be the production of 2,664 lbs/hour of corn oil with a value of $399.59/hour and 37,778 lbs/hr of distillers dried grain solubles having a moisture content of 8.0% and a value of $1,322.24/hour. The total operating cost is $815.55/hour, and the total product value is thus $1,721.83/hour.

Compare these figures with those provided in FIG. 5, in which a corresponding input of whole stillage produces 1,309 lbs/hour of corn oil having a value of $196.34/hour and 39,251 lbs/hr of distillers dried grain solubles having a moisture content of 8.0% and a value of $1,373.79/hour. This processing also has an estimated operating cost of $722.22/hour and a product value of $1,570.13 per hour. The net figures are $847.91 for the arrangement shown in FIG. 5, and $906.28 for the one of FIG. 6, which is an approximate 6% gain per hour. In sum, the recovery of valuable oil using the technique illustrated in FIG. 6 is more than doubled for every hour of processing (2,664/1,309=2.03), which is expected since approximately half of the oil otherwise remaining in the wet grains (which is about two thirds of the total) is now being recovered.

FIG. 7 shows an alternate embodiment in which a two phase decanter 16a is used as the first separator instead of the three phase one. From the "raw material" (whole stillage) serving as the byproduct, the two phase decanter 16a produces distillers wet grains (essentially, the solid phase) and a liquid phase, which may again be separated into the wash water and the decanter liquid. If separated, the wash water from decanter 16a may then be processed along with the distillers wet grains as described above, including using a second separator such as two phase decanter 18. The wash water return from this second decanter 18 may be combined with the decanter liquid phase from the first decanter 16a to create the thin stillage.

As described above, the thin stillage may then be evaporated and separated into valuable oil and syrup (including suspended solids), such as by using the third separator (centrifuge 14). The syrup is combined with the washed wet grains from the second separator (decanter 18) and dried. This produces the same total value per hour number as the arrangement shown in FIG. 6, but at a slightly lower operating cost because only two phase decanters 16a, 18 are used as the first and second separators, respectively.

FIG. 8 shows yet another possible approach similar to the one in FIG. 6, but the positions of a two phase decanter 16a serving as a first separator and three phase decanter 18a serving as a second separator are essentially switched. The oil/emulsion phase and wash water from the downstream three phase decanter 18a is then mixed with the thin stillage prior to evaporation and separation. The resulting syrup is then mixed with the "washed" wet grains and dried. This produces the same total value per hour number as the arrangement shown in FIGS. 6 and 7 at a comparable operating cost.

Figure 9:
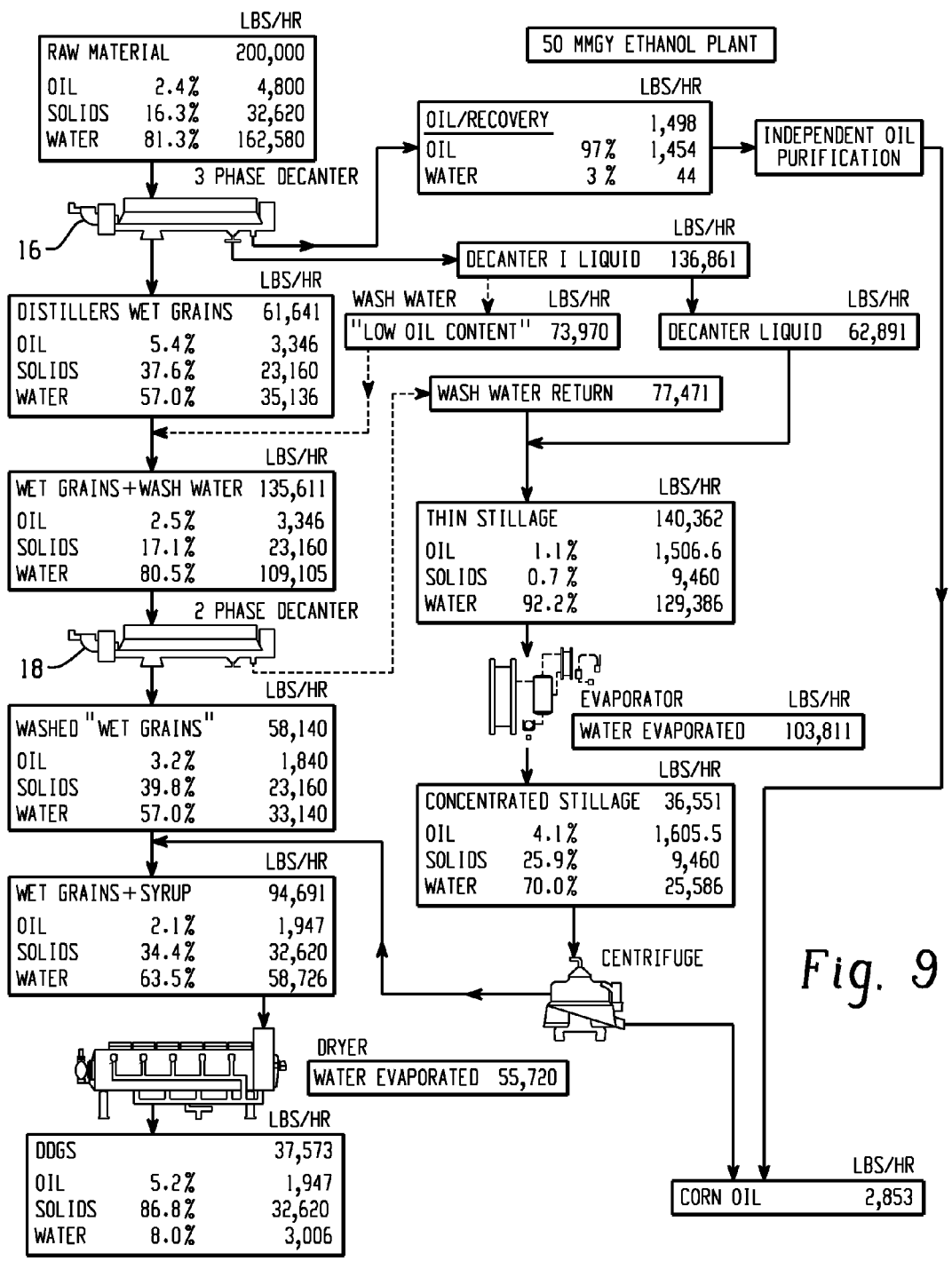
FIG. 9 is a schematic flow chart illustrating a technique and system for washing whole stillage to maximize oil recovery similar to the one shown in FIG. 6.

FIG. 9 illustrates yet another aspect of the invention in which a three phase decanter 16 precedes a two phase decanter 18. Comparing with the similar arrangement shown in FIG. 6, the noteworthy difference is that the decanter 16 is shown operating at a higher efficiency in terms of producing oil. As a result, the substantially pure (97%) oil recovered from the first separator (decanter 16) may simply be processed independent of the thin stillage, which in the illustrated example results in an approximate 6.6% increase in the pounds of valuable oil produced per hour. The means or device for recovering oil via independent processing, or purification, may comprise any suitable device for separating oil from a mixture, such as a gravity separator (which advantageously requires no additional energy input to effect separation and, thus, further enhances efficiency), a centrifuge, a disk-stack centrifuge, a centrifugal decanter, or an evaporator. Means for recovering oil using known techniques of chemical addition (pH adjustment, enzymatic action, etc.) may also be effective.

Figure 10:
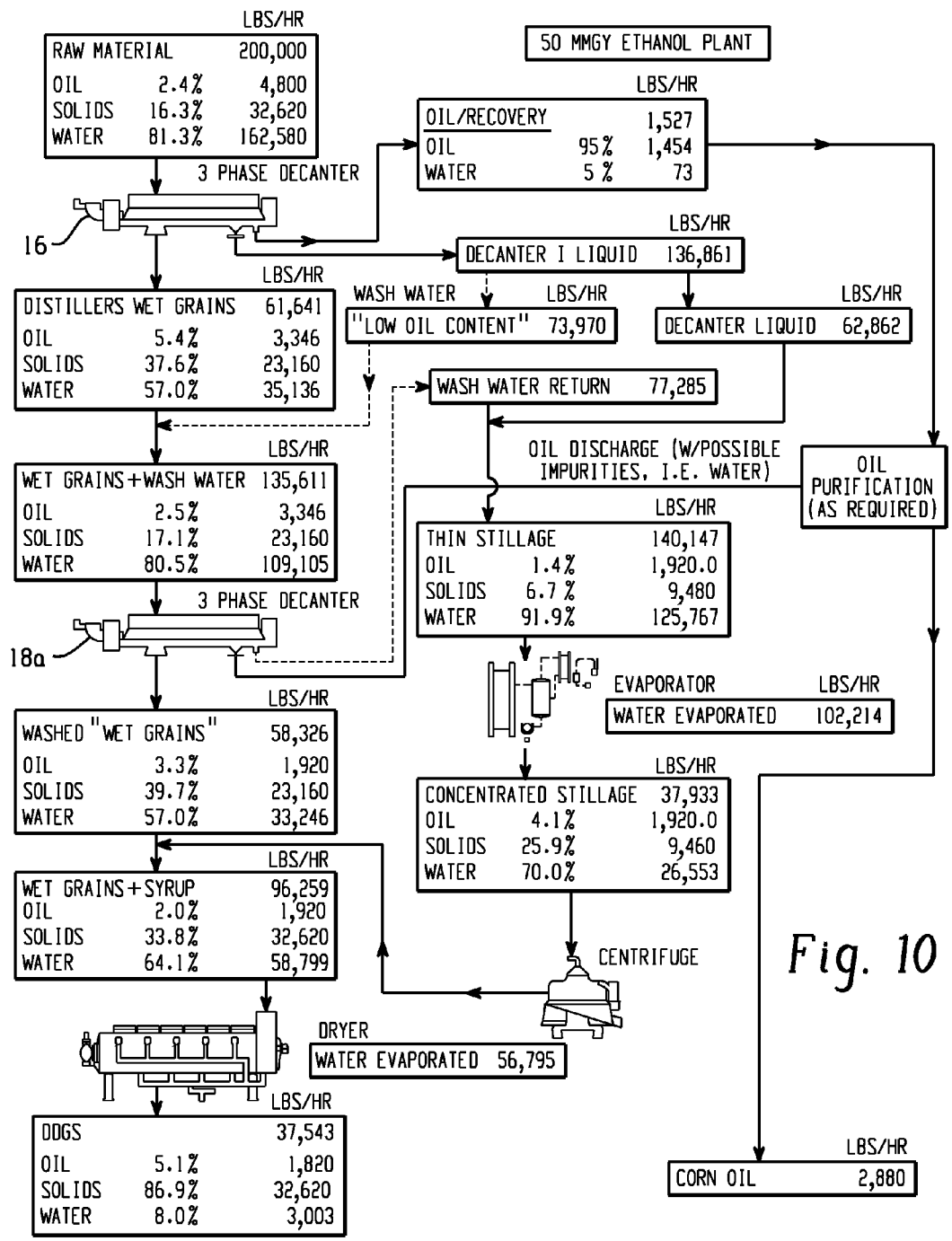
FIG. 10 is a schematic flow chart illustrating still another technique and system for washing whole stillage to maximize oil recovery.

FIG. 10 illustrates a three phase decanter 16 followed by a second three phase decanter 18a. Again, the oil phase output from the first and second separators (three phase decanters 16, 18a) may be independently processed or purified using the above-referenced processing means, if possible in view of the moisture content of the output, or may be recombined with the thin stillage, evaporated, and then subjected to separation, such as using a disk stack centrifuge. Again, with the former technique, an overall increase in the amount of oil recovered per hour results, possibly without any significant input of energy (in the case of gravity separation or chemical addition).

Figure 11:
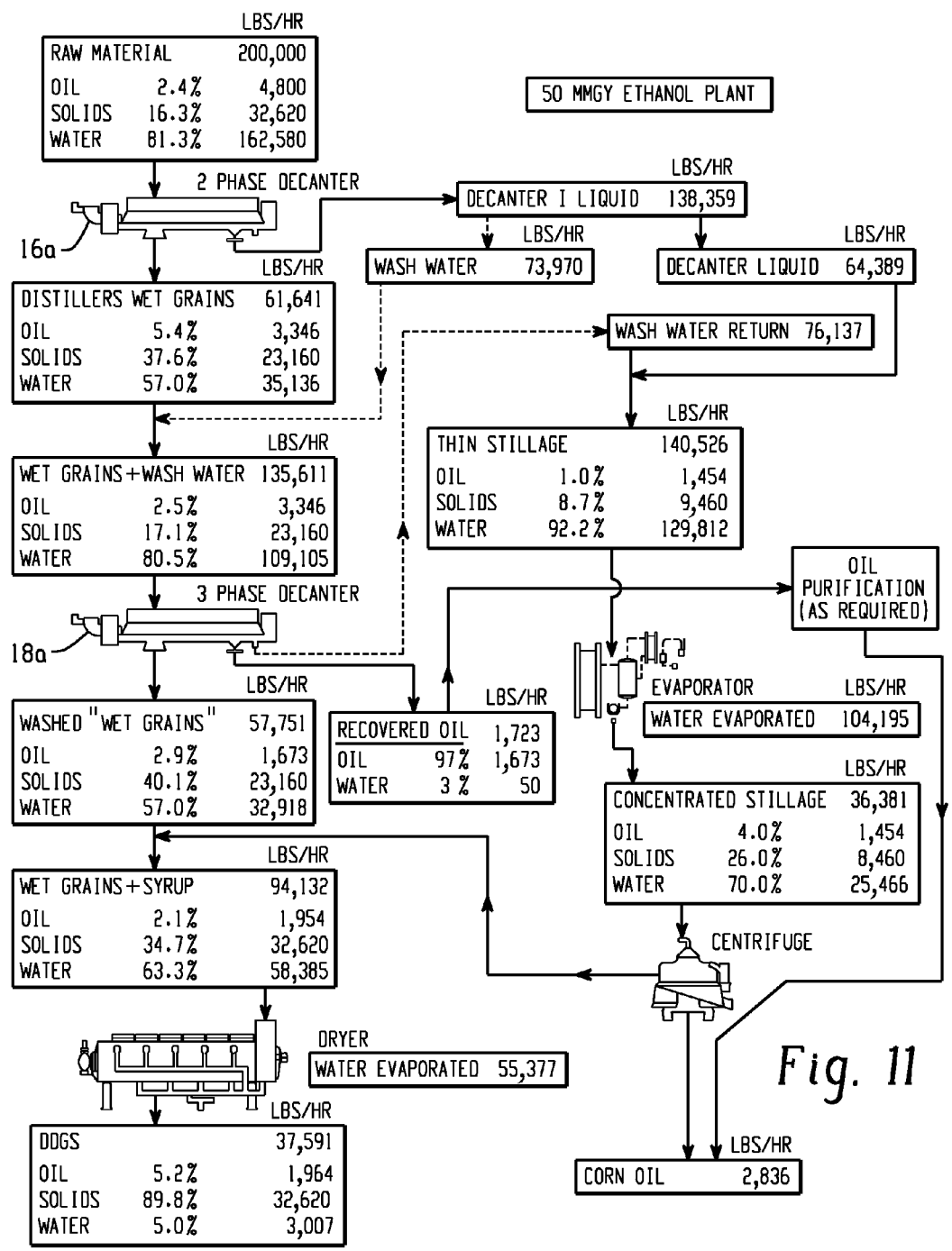
FIG. 11 is a schematic flow chart illustrating a technique and system for washing whole stillage to maximize oil recovery similar to the one shown in FIG. 8.

Finally, FIG. 11 illustrates a two phase decanter 16a followed by a three phase decanter 18a. The oil phase output from the second separator (three phase decanter 18a) may be independently processed or purified using the above-referenced processing means, if possible in view of the moisture content of the output, or may be recombined with the thin stillage, evaporated, and then subjected to separation, such as using a disk stack centrifuge. Again, with the former, a significant overall increase in the amount of oil recovered per hour results as compared with the arrangement shown in FIG. 8, possibly without any significant input of energy.

The foregoing description provides illustration of the inventive concepts. The descriptions are not intended to be exhaustive or to limit the disclosed invention to the precise form disclosed. Modifications or variations are also possible in light of the above teachings. For example, the syrup recovered from the disk stack centrifuge may be evaporated and processed again in a further effort to recover oil before drying. Moreover, in addition to a self-cleaning bowl type centrifuge as the means for recovering oil from the thin stillage, a nozzle bowl disk stack centrifuge would work, as could a horizontal centrifugal three phase decanter. The oil recovered using the disclosed processes and systems may also be used as "biodiesel" for powering motors, engines, or the like. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:
1. A method for recovering oil in a dry milling process for producing ethanol from corn, the method comprising:
  separating a whole stillage byproduct of the dry milling process with a separator into a distillers wet grains fraction, a thin stillage fraction, and an oily fraction;
  combining the oily and thin stillage fractions;
  evaporating the combined fractions of the oily fraction and the thin stillage fraction to remove moisture and form a concentrate of the oily and thin stillage fractions;
  recovering oil from the concentrate with an additional separator;

evaporating the concentrate to further reduce the moisture content of the concentrate and form an evaporated concentrate; and mixing the evaporated concentrate with the further reduced moisture content with the distillers wet grains fraction.

2. The method of claim 1, further comprising adding a chemical additive during the step of recovering the oil from the concentrate.

3. The method of claim 2, wherein adding the chemical additive comprises adjusting a pH of the concentrate.

4. The method of claim 2, wherein adding the chemical additive comprises adding enzymes.

5. The method of claim 1, wherein recovering oil from the concentrate with the additional separator further recovers an additional distillers wet grains fraction and an additional thin stillage concentrate fraction.

6. The method of claim 5, wherein recovering oil from the concentrate with the additional separator comprises recovering the oil with a horizontal centrifugal three phase decanter.

7. The method of claim 5, wherein recovering oil from the concentrate with the additional separator comprises recovering the oil with disc stack centrifuge.

8. The method of claim 5, further comprising evaporating the additional distillers wet grains fraction and the additional thin stillage concentrate fraction to further reduce the moisture content therein.

9. A method for recovering oil in a dry milling process for producing ethanol from corn, the method comprising:

evaporating a thin stillage fraction to form a thin stillage concentrate with a reduced moisture content relative to the thin stillage fraction;

recovering oil from the thin stillage concentrate with a horizontal centrifugal three phase decanter;

evaporating the thin stillage concentrate to further reduce the moisture content of the thin stillage concentrate and form an evaporated thin stillage concentrate; and mixing the evaporated thin stillage concentrate with a distillers wet grains fraction.

10. The method of claim 9, further comprising adding a chemical additive during the step of recovering the oil from the concentrate.

11. The method of claim 10, wherein adding the chemical additive comprises adjusting a pH of the concentrate.

12. The method of claim 10, wherein adding the chemical additive comprises adding enzymes.

* * * * *